United States Patent [19]

Katayama

[11] 4,366,549

[45] Dec. 28, 1982

[54] MULTIPLIER WITH INDEX TRANSFORMS MODULO A PRIME OR MODULO A FERMAT PRIME AND THE FERMAT PRIME LESS ONE

[76] Inventor: Aisuke Katayama, 2-47 Kawamotomutsumicho, Akita-shi, Akita, Japan

[21] Appl. No.: 178,676

[22] Filed: Aug. 15, 1980

Related U.S. Application Data

[63] Continuation-in-part of Ser. No. 34,145, Apr. 27, 1979, abandoned.

[30] Foreign Application Priority Data

May 1, 1978 [JP] Japan .................................. 53-50747

[51] Int. Cl.³ .................................................. G06F 7/52
[52] U.S. Cl. ....................................... 364/757; 364/746
[58] Field of Search .......................... 364/757, 754, 746

[56] References Cited

U.S. PATENT DOCUMENTS

3,610,901  10/1971  Lynch .................................. 364/724

OTHER PUBLICATIONS

Mitchell, Jr., "Computer Multiplication & Division Using Binary Logarithms" *IRE Trans. on Electronic Computers* Aug. '62 pp. 512-517.

Brubaker et al., "Multiplication Using Logarithms Implemented with Read-Only Memory" *IEEE Trans. on Computers* vol. C-24, No. 8, Aug. 1975, pp. 761-765.

Bywater "Error Reduction in ROM Multipliers" *Electronic Engineering* vol. 49, No. 593, Jun. 1977, p. 17.

*Primary Examiner*—David H. Malzahn
*Attorney, Agent, or Firm*—Laff, Whitesel, Conte & Saret

[57]  ABSTRACT

An asynchronous data-processing system for multiplying two binary numbers, by a use of read-only memories storing tables of data for transforming the numbers into exponents of a prime number. The exponents are added and then transformed back into the terms of the original numbers system. The transforms produce the product of the two numbers merely by addressing read-only memories and, therefore, accomplish the multiplication at a very high speed. Sophistications of the system compensate for variations in the bit patterns of input signals, inabilities to handle some numbers in the numbering systems, and the like. A use of Fermat prime numbers eliminates rounding errors which occur in systems using logarithmic transforms.

20 Claims, 6 Drawing Figures

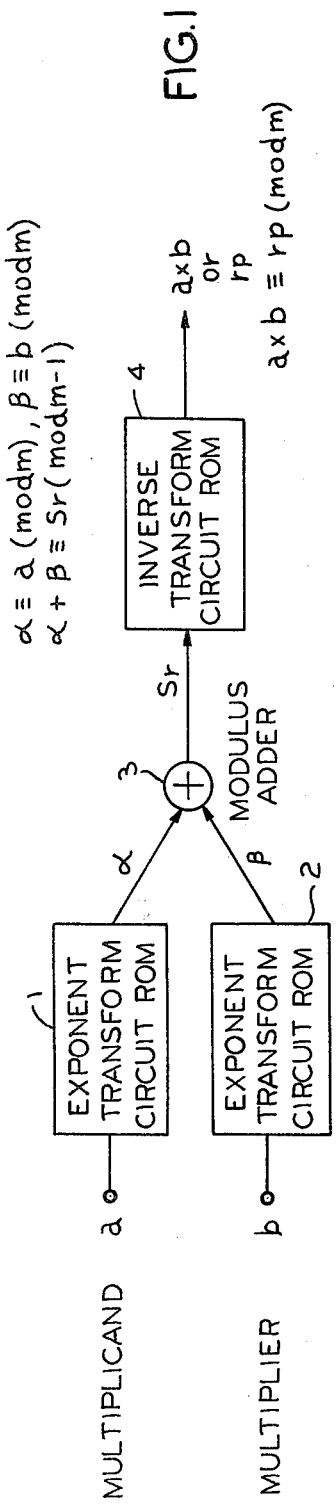
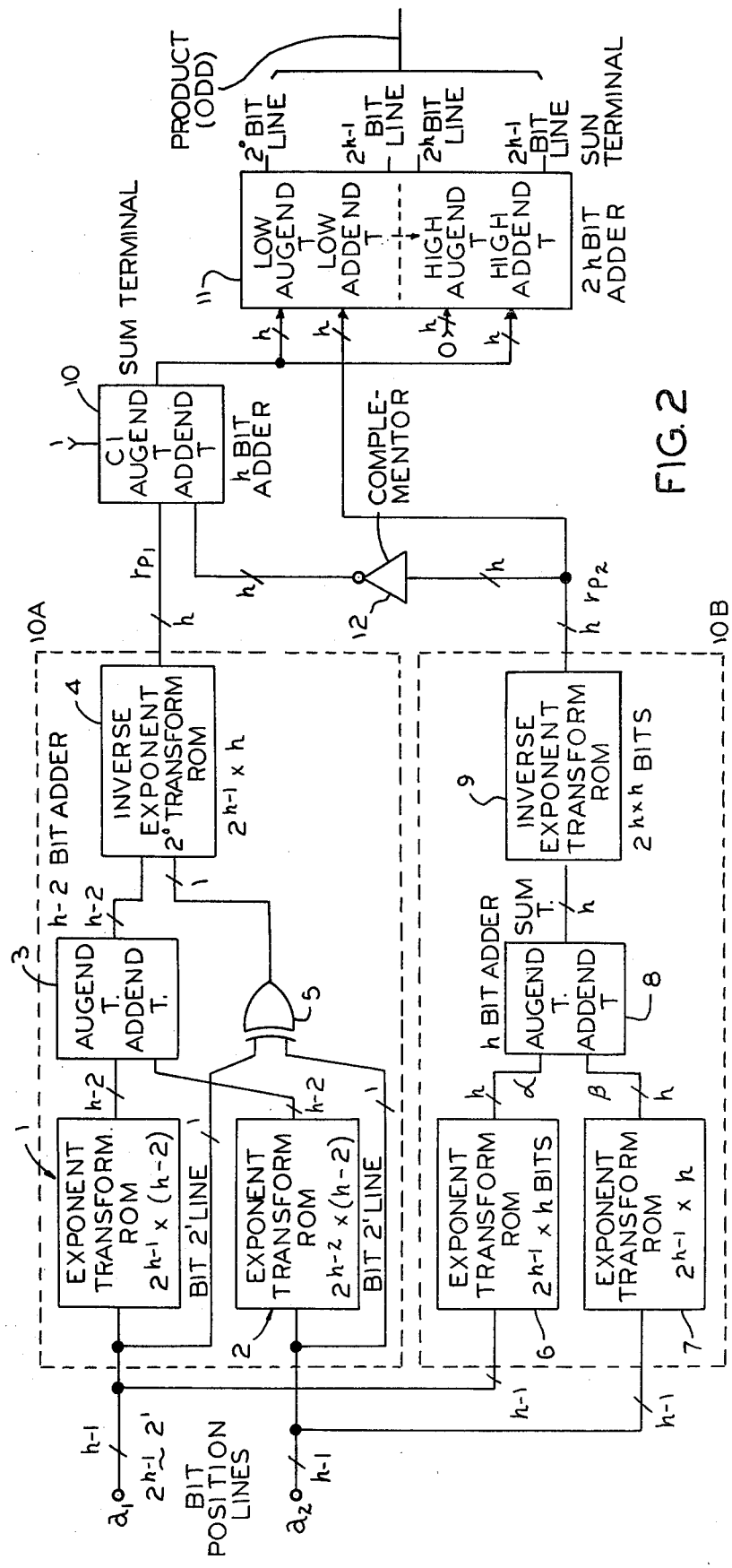

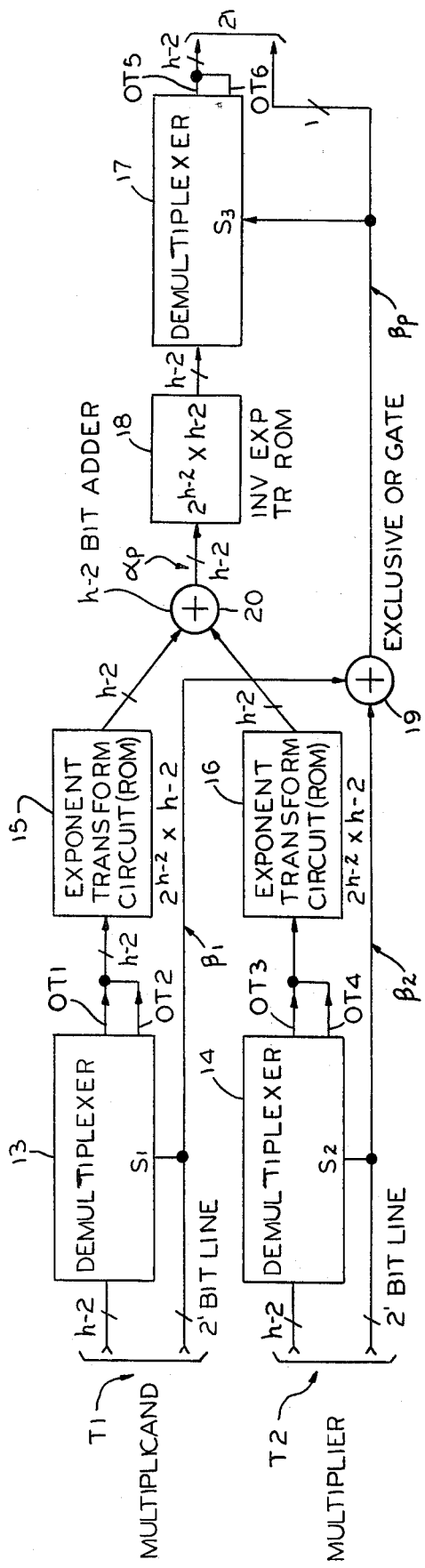
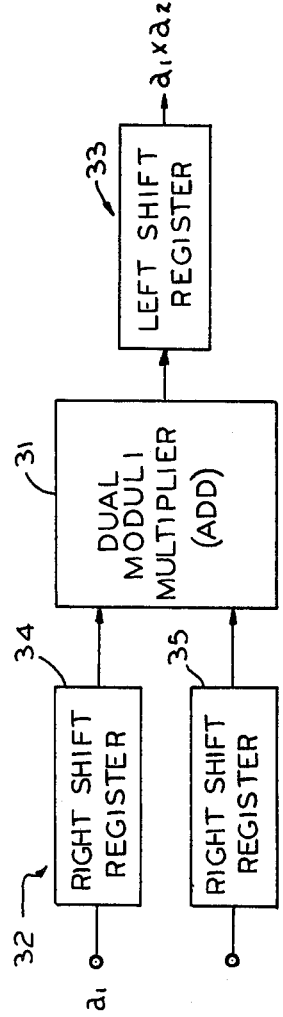
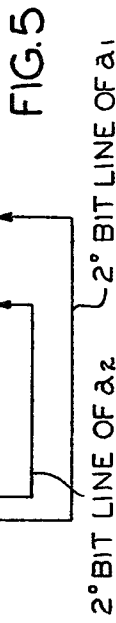
FIG.3
FIG.4
FIG.5

MULTIPLIER WITH INDEX TRANSFORMS MODULO A PRIME OR MODULO A FERMAT PRIME AND THE FERMAT PRIME LESS ONE

This is a continuation-in-part application of my copending patent application Ser. No. 34,145 filed Apr. 27, 1979 now abandoned.

This invention relates to a multiplication system which is especially—although not exclusively—well-suited for use in an electronic digital computer or similar data-processing equipment.

Multiplication is carried out under the control of a clock pulse sequence in most conventional multiplication systems or in multipliers used in digital computers, data processors, or the like. These multipliers operate relatively slowly because a multiplicity of successive calculation steps are carried out, with attention directed to the many carries which take place during the calculation. The multiplier becomes too complicated and intricate when an attempt is made to raise the clock rate.

It is well-known to use logarithmic transforms when calculating a product resulting from a multiplication of a plurality of numbers. With such a logarithmic transform multiplier, it is possible to reduce the number of calculation steps and, therefore, to raise the speed of multiplication. However, a round error is inevitable because most of the logarithmic transforms are not whole numbers. A logarithmic transform multiplier becomes bulky when attempts are made to reduce the rounding error.

Therefore, an object of the present invention is to provide simple structure for multiplication at a high speed.

An object of the present invention is to overcome the disadvantages and limitations of prior multiplication systems by providing new and improved multiplication systems.

Another object of this invention is to provide a multiplication system of the described type, which is operable without a round error and yet is not bulky.

In keeping with an aspect of the invention, a multiplication circuit is based on the exponent and residue relationship in the number theory. An ordinary integer is assigned as a residue. Because the exponent and the residue are all whole numbers in the prescribed ranges, no round error is generated. Further, the required bit size of the read-only memories ("ROM's") is far smaller than the bit size of ROM's which are used in the logarithmic system.

For instance, the 8-by-8 bit multiplier using the inventive exponent transform multiplication system requires a ROM having only 6528 bits. The multiplication speed of the inventive exponent transform multiplication system is mainly limited by the ROM access time. Thus, a higher speed operation is assured by the future advances of the integration technology.

According to a further aspect of this invention, a multiplication system calculates a product of two integers by a use of (1) a prime number m as a modulus, and (2) the fact that a predetermined natural number (to the power of $m-1$ consecutive whole numbers) is congruent with residues which are a modulo of the prime number m. The predetermined natural number should be a primitive root inherent to the prime number m. When arranged in an ascending order, the residues form a set of $(m-1)$ consecutive integers. A one-to-one correspondence is established between the whole numbers and the consecutive integers. The two integers should be given as a first and a second of the consecutive integers. The second integer may be identical with the first integer.

The modular arithmetic approach has been developed for the multiplication system. However, the main concern of such a system is limited to the direct modulus or moduli calculation usages.

The invention refers to the transform method of multiplication which is based on the exponent and the respective residues relationship. In the invention, the ordinary positive integers are assigned as the residues of the prescribed modulus that governs the exponent transform multiplication system. Then, these residues are converted into the respective exponents of a fixed primitive root or a quasi-primitive root which is inherent to the prescribed modulus. In the prescribed range, the residues can be made to correspond uniquely to the exponents. A basic concept of the invention relies upon the fact that the modular multiplication among the residues corresponds uniquely to the modular addition among the respective exponents.

The multiplication system is composed of three fundamental components, that is, exponent transform circuits, a modulus adder, and an inverse exponent transform circuit. The first transform means transforms the first and the second integers into a first and a second index, respectively. The first and the second indices are given by those two whole numbers which are in a one-to-one correspondence with the first and the second integers, respectively.

The adder means derives a modulus sum from the first and the second indices. The modulus sum is such that a sum of the first and the second indices is congruent with the modulus sum modulo, the prime number m less one.

The second transform means transforms the modulus sum into the product. The product is given by that one of the consecutive integers which is in a one-to-one correspondence with one of the whole numbers. That one whole number is given by the modulus sum.

A basic multiplication operation is performed as follows: First, a multiplicand and a multiplier are considered as the residues and are applied as the inputs to the respective exponent transform circuits. Then, the exponents appear on the outputs of the respective exponent transform circuits. Next, these exponents are automatically summed by the modulus adder. Then, the resulting sum exponent is applied to an inverse exponent transform circuit. The output product residue appears, and gives the real product, when the product is less than the modulus.

This exponent transform multiplication system is an asynchronous system and can be implemented most efficiently and quickly when used as a binary multiplication system.

A read-only memory ROM can be used to perform the exponent and inverse exponent transforms. The required memory size for such a transform is far less than the memory size required for the logarithmic multiplication system. There are no rounding errors in the exponent transform multiplication system.

For instance, a 4-by-4 binary multiplier using the exponent transform multiplication system with the modulus 257 ($2^8+1$) requires a ROM having only 2304 bits.

The invention also relates to a multiple moduli exponent transform multiplication system. In this system, the dual moduli exponent transform multiplication system uses the dual moduli $2^h$ and $2^h+1$ which are composed of a parallel connection of a first exponent transform multiplication subsystem (with the modulus $2^h$) and a second exponent transform multiplication subsystem (with the modulus $2^h+1$). This dual moduli system enables the respective product residues to give the real product when a multiplicand and multiplier are applied to the inputs of the dual moduli system.

This fact is based on the remarkable newly-found relationship. Accordingly, by using the respective product residues for the different moduli which are appropriately summed by a mod $2^{2h}$ adder, that is a 2 h bit adder, the real 2 h bits product appears on the output of the adder. The 8-by-8 bit multiplier can be constructed from 5898 bit ROM's, by means of which all exponent transform circuits and inverse exponent transform circuits may be implemented.

However, the dual moduli multiplication system is limited to odd integers only. For multiplying every binary (i.e., both odd and even) integer, some simple compensating logic is required. As stated above, the dual moduli system is also an asynchronous system and the limitation of the multiplication speed depends only upon the ROM access time and the adder delay.

BRIEF DESCRIPTION OF THE DRAWINGS

The foregoing and other objects, features, and attendant advantages of the present invention will be better understood from a study of the following description and accompanying drawings wherein:

FIG. 1 is a block diagram of a basic structure of a one modulus exponent transform multiplication system, according to the present invention;

FIG. 2 is a block diagram of a dual moduli exponent transform multiplication system, also according to the present invention;

FIG. 3 is a block diagram of an improved subsystem using a $2^h$ modulus wherein the respective memory size of exponent transform ROM's and inverse exponent transform ROM's are reduced to $2^{h-2} \times (h-2)$;

FIG. 4 shows a block diagram of a compensating circuit which is carried out by shift register operations;

FIG. 5 shows a block diagram of a compensating circuit using $2^0$ bit portions of the binary integer being multiplied.

Figure 6:
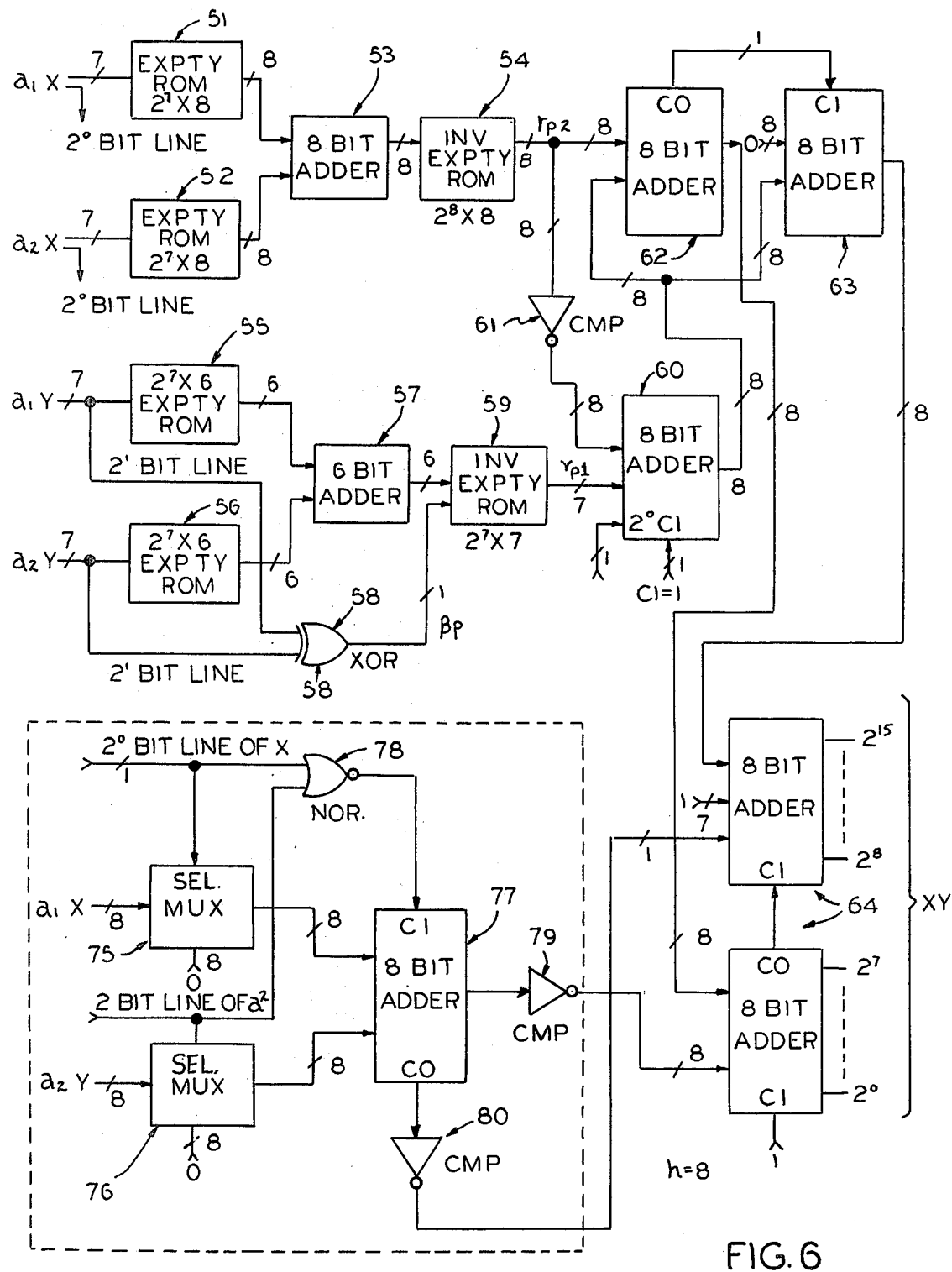
FIG. 6 shows a detailed diagram of a compensated dual moduli exponent transform multiplication system.

In the preferred embodiments of the invention, the number theory provides the basic concepts which are necessary to implement an embodiment of the invention.

Therefore, a short review of the theory is given first. Let a,b, . . . , m,k, . . . be assumed to be positive integers. And, if the following relationship holds $$a = b + k^*m \text{ where } k=0,1,\ldots \qquad (1)$$

then, a and b are congruent with the modulus m, or more precisely, a and b have the congruent relationship referring to the modulus m, and may be written as $$a \equiv b \pmod{m} \qquad (2)$$

In this congruent relationship, b is always either a positive integer or 0, and b is less then the modulus m. In the embodiments of the invention, b (that is the left-hand number of (mod m)), is hereafter called a "residue." The residue class mod m is defined as the set of b, that is, $[b] = [1,2,\ldots,m-1]$.

The residue class illustrated for the modulus 7 is as follows:

$$Z = [b] = [1,2,3,4,5,6]$$

The reduced residue class R is defined as the integers set that are coprime with the modulus m. That is, when the modulus is a prime number, the residue class Z is equal to the reduced residue class R. In the above example, the modulus is 7, that is, prime, and Z=R holds. While m=8, the residue class Z is $[b]=[1,2,3,4,5,6,7]$, but the reduced residue class R is $[1,3,5,7]$, that is, $Z \neq R$. This states that, if the modulus is not prime, then the number of integers in the set decreases. The Euler function $\psi(m)$ is equal to the number of integers in the reduced residue class, that is, the number of integers that are coprime to the modulus m and further less than m. Thus, if the modulus m is prime, the Euler function $\psi(m)$ indicates the total number of integers less than m, that is, $\psi(m) = m - 1$. The Fermat number F is denoted by $F = 2^h + 1$, where $h = 2^k$, and for $k \leq 4$. It is then known that the Fermat number is prime. For $k=3$, $h=8$, the Fermat number is $2^8 + 1$, that is, 257. In this case, the residue class is equal to the reduced residue class, and it is shown as follows:

When $Z = R = [b] = [1,2,3, \ldots, 255, 256]$; the modulus is 257. From the reduced residue class, if the element shifts right and adds 0 as the left-most element, the modified reduced residue class R' may be obtained as follows:

$$R' = [b] = [0,1,2, \ldots 254,255] \qquad (3)$$

This residue class is very important. If all integers are in the binary form $h=8$, then all 8-bit length integers are included in the residue class or, more easily, in the residue set of the modulus 257.

The primitive root g which is inherent to the prime or composite modulus m exists and satisfies the following congruent relation:

$$g^{\psi(m)} \equiv 1 \pmod{m} \qquad (4)$$

If m is prime, and if $\alpha$ is a positive integer which is less than $m-1$, there is a respective residue a which is included in the reduced residue class $[1, \ldots m-1]$. The following congruent relationship then holds:

$$g^\alpha \equiv a \pmod{m}; \text{ m prime} \qquad (5)$$

In this relationship of the primitive root inherent to the modulus m, the exponent $\alpha$, corresponds uniquely to the respective residue a. Thus, the mapping relationship holds between the exponents and the residues as shown: $[\alpha, \ldots] = [a, \ldots]$. The exponent class that corresponds to the residue class is $$[0,1,\ldots \alpha, \ldots \beta, \ldots m-2]; \text{ m prime} \qquad (6)$$

If an exponent other than $\alpha$ is $\beta$, then b exists as the respective residue, and the following congruent relation holds:

$$g^\beta \equiv b \pmod{m} \qquad (7)$$

Following the modular arithmetic, the congruent relation holds:

$$g^\alpha * g^\beta = g^{\alpha+\beta} \equiv a*b \ (\text{mod } m) \quad (8)$$

if $\alpha+\beta$ is in the exponent class and a*b is in the reduced residue class. The property shown in equation (8) is the basic fact that, if the sum exponent $\alpha+\beta$ is in the exponent class, and if the product residue a*b is in the reduced residue class, then the real product a*b corresponds uniquely to the sum exponent $\alpha+\beta$. However, if the sum exponent $\alpha+\beta$ is larger than m−1, the sum exponent residue with the modulus m−1, denoting $S_r$, is satisfied by the following congruent relationship:

$$\alpha+\beta \equiv S_r \ (\text{mod } m-1), \quad (9)$$

and if a*b, the real product is the reduced residue class for the modulus m, that is, a*b is less than m. Then, the following relationship holds:

$$g^{S_r} \equiv a*b \ (\text{mod } m) \quad (10)$$

where $S_r$ is in the exponent residue class, and $S_r$ corresponds uniquely to the real product a*b which is in the reduced residue class. The operation indicated by equation (9) is automatically implemented by the modulus m−1 adder.

And further, if the real product a*b is greater than the modulus m, then a*b is not included in the reduced residue class, so the following relationship holds:

$$a*b \equiv r_p \ (\text{mod } m) \quad (11)$$

In this case, the following relationship holds:

$$g^{S_r} \equiv r_p \ (\text{mod } m) \quad (12)$$

The sum exponent or the sum exponent residue corresponds uniquely to the residue of the real product which is denoted by $r_p$, and such a residue is described as a product residue.

The exponent transform used in the embodiments of the inventions is defined in the following manner. For the prescribed modulus m, there is at least one primitive root which is inherent to the modulus m, if m is prime. Thus, if the primitive root g is fixed; then, by following the congruent relationship of equation (5), the reduced residue class R corresponds one by one to the exponent residue class.

When m is prime, $\psi(m)=m-1$, and equation (4) becomes $g^{m-1}\equiv 1 \ (\text{mod } m)$ while $g^o \equiv 1 \ (\text{mod } m)$, the residue 1 corresponds to two exponents 0 and m−1, so the exponent m−1 is deleted to obtain the exponent residue class $[\alpha's]=[0,1,2\ldots,\ldots m-2]$.

Therefore, the exponent transform is a mapping operation by which a residue in the reduced residue class converts an exponent residue class where these classes are related by the congruent relationship of equation (5). The inverse exponent transform is a vice versa operation wherein an exponent is uniquely converted back into a residue in the reduced residue class.

The inverse exponent transform table can be derived easily by a computer when the modulus and the inherent primitive root are known. Rearranging the residue in order, the exponent transform table is obtained.

If the prime modulus m is a Fermat number $2^h+1$, h=8, m=257 and one of the inherent primitive roots is known as 10, so that g=10, m=257. The attached Table 1 and Table 2 are obtained by using the above-mentioned procedure. These Tables provide the exponent transform and the inverse exponent transform, respectively. For instance, Table 1 converts a residue "30" to an exponent 88, and vice versa. In these tables, some modification is made to have all integers represented.

One Modulus Exponent Transform Multiplication System

FIG. 1 is a block diagram showing a first and preferred embodiment of the invention which calculates a product XY of first and second integers X and Y, by the use of a one-to-one correspondence which is derived, as above, from the number theory. The one-to-one correspondence is derived by index transforms, primarily through a use of a single modulus which is equal to a prime number m. Therefore, the multiplication system is called a single-modulus index transform multiplication system.

The multiplication system comprises a first transforming unit 1 for transforming the first and the second integers X and Y into first and second indices x and y, respectively. The first and second indices x and y are given by those two consecutive whole numbers, (m−1), which are in a one-to-one correspondence with the first and the second integers X and Y, respectively.

The multiplication system further comprises a modulus adder for calculating a modulus sum s by a use of the first and the second indices x and y. In accordance with the congruence, a sum of the first and the second indices x and y is congruent with the modulus sum s modulo the prime number less one (m−1). The second transforming unit 4 transforms the modulus sum s into the product XY, with the product XY being given by that one of the consecutive integers, (m−1), which is in a one-to-one correspondence with one of the consecutive whole numbers in the index class E (mod m), if that one whole number is given by the modulus sum s.

In FIG. 1, the one modulus exponent transform multiplication system is composed of three basic circuits. Exponent transform circuits 1 and 2, a modulus adder 3, and an inverse exponent transform circuit are connected in aforementioned order.

The first components or exponent transform circuits 1, 2 are simple ROM's which store tables of data to perform the exponent transforms. If a residue is in the reduced residue class with the prescribed modulus m applied, the residue is converted into the respective exponent which is obtained as an output number.

The second component 3 is a modulus adder which performs a summation with the modulus m−1 of the exponents which are generated in the exponent transformation circuits 1, 2, and which provides a sum exponent on its output.

The third component is another ROM forming the inverse transform circuit 4 which converts the applied sum exponent into the respective residue and provides it on the output.

The basic multiplication operation is performed as follows:

First, a multiplicand and a multiplier (which are considered as the residues) are input signals applied to the respective input terminals a, b of the exponent transform circuits 1, 2. Then, these input signals address the ROM's and exponents appear at the outputs of the respective exponent transform circuits 1 and 2.

Next, these exponents are automatically summed by the modulus adder 3. Then, the resulting sum of the exponents is applied from the adder 3 to the inverse exponent transform circuit 4. The output of circuit 4 is the product residue, which gives the real product when the value is less than the modulus.

The one modulus exponent transform multiplication system can be applied most effectively to a binary multiplication system.

In the binary exponent transformation system, the circuits that perform the exponent and inverse exponent transforms can be implemented by read-only memories (ROM's) or by equivalent logic circuits. If the exponent transform is implemented by a ROM, a residue in the reduced residue class with the modulus m is considered as an address of the ROM. The corresponding exponent of the residue is stored at the memory location, the address of which is the respective residue. By continuing the same procedure, the ROM becomes an exponent transform circuit.

The operation of the exponent transform ROM is explained. A binary integer of n bits is an address applied to one of the address lines of the ROM. When a chip select signal is given, the data stored at the address gives a signal which indicates the relative exponent at the output. The ROM that implements the inverse exponent transform can be constructed by storing a residue in the memory location, the address of which is the respective exponent. The respective residue appears responsive to a binary exponent addressing the inverse exponent transform ROM 4.

The binary multiplication system using the exponent transform multiplication system:

The modulus that governs the binary numbers is comprised of a number, such as $2^h$, for the preferred embodiment of the binary multiplication system. In the described binary multiplication system, the modulus is a prime Fermat number such that $m=2^h+1$.

A multiplicand and a multiplier are assumed as n and m bit binary integers. Then, the bit sizes of the exponent transform ROM's are $2^n*h$ and $2^m*h$, respectively. The exponents generated are of h-bit length. They are summed by the modulus $2^h$ adder which generates the h-bit sum exponent. The bit size of the inverse transform ROM is $2^h*h$. Upon addressing the inverse exponent transform ROM responsive to the sum exponent, the real product or product residue appears on the output, where the bit length is h.

Because the bit length of the product is equal to the sum of the bits of the multiplicand and the multiplier, a real product is obtained, when $m+n=h$. For $h=8$, $m=n=4$, the modulus 257 exponent transform system provides a 4-by-4 multiplier with only 2,304 bits of the ROM's. If either or both of the multiplicand and the multiplier is "0," then the exponent transform ROM generates $2^7$; when $h=8$, it is 128 which is 10000000 in binary form. A simple logic circuit may complete the one modulus exponent transform multiplication system by clearing the output if the bit position 7 equals "1," and all other bit positions are "0." This supplemental scheme is an easily conceivable matter, so it is not shown in FIG. 1. Multiplexing the multiplicand and the multiplier causes a reduction in the number of the exponent transform circuits.

A simple example will clarify the operation of the one modulus exponent transform multiplication system. For $a=12$, $b=13$, the product is obtained as follows: From Table 1, the respective exponent $\alpha=247$, $\beta=6$. Thus, the sum of the exponents $\alpha+\beta=247+6=253$. This summation is automatically performed by the 8-bit adder 3. Then, from Table 2, the product residue $r_p$ for the sum exponent 253 is read as 156 (which is less than 256), so $r_p$ is a correct product, that is, $a*b=156$.

Since this calculation is asynchronous and automatic, the speed is limited only by the memory access times and by adder delay, thus giving a high-speed and error-free operation.

Plural Moduli-Exponent Transform Multiplication Systems

In the binary multiplication, if the multiplicand and the multiplier are h-bit integers, the product is a 2h-bit integer. When the h-bit multiplicand and multiplier are applied to the binary exponent multiplication system governed by the modulus $2^h+1$, the output is always a product residue that differs from the real product, since the bit length of the system is restricted to h.

However, the following embodiment of the invention confirms that the 2h-bit real product can be obtained by using the h-bit product residue generated with the above-mentioned binary exponent multiplication system. This is a remarkable fact.

A plural moduli exponent transform multiplication system is another embodiment of the invention. It is composed of a plurality of subsystems, each of which has the respective modulus, and of auxiliary circuits.

In FIG. 2, circuit portion 10A is enclosed by dashed lines, and illustrates a $2^h$ modulus exponent transform subsystem which locates an upper portion of a number. The circuit portion 10B is also enclosed by a dashed line, and illustrates a $2^h+1$ modulus exponent subsystem which locates a lower portion of a number.

The parts of FIG. 2 which are the same as the parts of FIG. 1 are identified by the same reference numerals, and will not be explained again.

Circuit portion 10A also includes an exclusive OR gate 5, which means that it has an output when its inputs are inverted relative to each other. Circuit portion 10B contains the same components that are shown in FIG. 1; however, to avoid confusion, reference numerals 6, 7, 8 and 9 are substituted for reference numerals 1, 2, 3 and 4, respectively, without indicating any change in function.

An adder 10 adds the output of circuit portion 10A to a complement of the output of circuit portion 10B, which is derived by a complementor circuit 12. Also, an adder 11 combines the outputs of circuit portion 10A, as the augend and of circuit portion 10B as the addend.

In greater detail, FIG. 2 shows the block diagram of a preferred embodiment of the invention relating to the dual moduli exponent transform multiplication system. In this binary system, the moduli are $2^h$ and $2^h+1$. As shown in FIG. 2, the modulus $2^h+1$ subsystem 10B is equivalent to the one modulus exponent transform multiplication system. However, the modulus $2^h$ subsystem 10A operates for only odd integers which are less than $2^h$, because the modulus $2^h$ is not prime for $h>1$.

The respective subsystems are one modulus exponent transform multiplication systems governed by the respective modulus. In a binary system, the dual moduli exponent transform multiplication system, is explained in detail as a preferred embodiment of the invention.

Binary integers of an h-bit length, which are being multiplied, are denoted as "X" and "Y". In the dual moduli exponent transform multiplication system, the two subsystems 10A, 10B having the modulus $2^h$ and $2^h+1$, respectively, are connected in parallel to the inputs $a_1$, $a_2$. When the integers X and Y are applied to the dual moduli system, the product residues of the respective modulus $2^h$, $2^h+1$ appear separately and simultaneously on the outputs of the respective subsystems, responsive to a readout of data stored in read-only memories 1, 2, 6 and 7 under the addresses "X" and "Y".

The real product XY has a congruent relationship to these product residues. The product residues are being denoted $r_{p1}$ and $r_{p2}$, respectively, as follows:

$$XY \equiv r_{p1}(\text{mod } 2^h)$$

$$XY \equiv r_{p2}(\text{mod } 2^h+1)$$

As stated in equations (1) and (2), the following relationships hold:

$$XY = A(2^h) + r_{p1} \quad (13)$$

$$XY = B(2^h+1) + r_{p2} \quad (14)$$

wherein A and B are respective quotients integers, and A is larger than B; thus, A−B is a positive integer. Equating these equations gives:

$$A2^h + r_{p1} = B2^h + B + r_{p2}$$

hence $$B = r_{p1} - r_{p2} + (A-B)2^h \quad (15)$$

Thus, the following congruent relationship holds:

$$B \equiv r_{p1} - r_{p2}(\text{mod } 2^h) \quad (16)$$

It is assumed that X and Y are the h-bit integers. The bit length of the real product XY is 2h. Therefore, XY is less than $2^h$. From equation (14), it is clear that B is less than $2^h$. In equation (15), the terms are such that $(A-B)2^h$ has all zero bits in its lower h-bit representation. From these facts, the following important equation is derived:

$$B = r_{p1} - r_{p2}(\text{mod } 2^h) \quad (17)$$

This equation shows that, when the product residue $r_{p1}$ and 2's complement of residue $r_{p2}$ are summed, the h-bit sum that deletes the overflow (if it occurs) is exactly equal to B. This operation can be made automatically by complementor 12 and by h-bit binary adder 10 wherein the carry in terminal is always held as 1.

Thus, by substituting equation (17) into equation (14), we get the following results:

$$XY = [r_{p1} - r_{p2}(\text{mod } 2^h)]2^h + [r_{p1} - r_{p2}(\text{mod } 2^h)] + r_{p2} \quad (18)$$

Consequently, the real product XY is obtained by a circuit which implements the operation that is indicated by the fundamental equation (18). The modulus $2^h$ sum of $r_{p1}$ and 2's complement of $r_{p2}$ is obtained on the sum bit output of the h-bit adder. Hence, the summation indicated by the equation (18) can be performed by a modulus $2^h$ adder, that is, by a 2h-bit binary adder. Then, the real product automatically appears on the 2h-bit sum output.

The addition of $[r_{p1} - r_{p2}(\text{mod } 2^h)]2^h$ requires the sum bit output of the h-bit adder to be connected to the high h-bit addend input of the 2h-bit adder 11, thereby leaving the same augend input at zero. The addition of $[r_{p1} - r_{p2}(\text{mod } 2^h)]$ and $r_{p2}$ requires the sum bit output of the h-bit adder and the output of the subsystem governed by the modulus $2^h+1$. These outputs are applied to the lower h-bit addend and augend input respectively.

An auxiliary circuit constructed as mentioned above generates a real product when the plural product residues of the subsystems having the respective modulus $2^h$ and $2^h+1$ are applied thereto.

As stated, the dual moduli exponent transform multiplication system is composed of the exponent transform multiplication subsystem 10B with the modulus $2^h$, subsystem 10A with the modulus $2^h+1$, and the auxiliary circuits 10, 11 and 12. In greater detail, FIG. 2 shows the block diagram of the preferred embodiment of the dual moduli exponent transform multiplication system. In this binary system, the moduli are $2^h$ and $2^h+1$. As shown in FIG. 2, the modulus $2^h+1$ subsystem 10B is equivalent to the one modulus exponent transform multiplication system. However, the modulus $2^h$ subsystem 10A operates for odd integers which are less than $2^h$, because the modulus $2^h$ is not prime for h>1. Although the modulus is not prime, there are some quasi-primitive roots denoted by "g's" and the congruent relation to the modulus m is given as follows:

$$\bar{g}^{l(m)} \equiv 1(\text{mod } m) \quad (19)$$

where l(m) is a divisor of the Euler function $\psi(m)$ that indicates the number of integers in the reduced residue class.

When the modulus m is $2^h$, $\psi(2^h)$ is known as $2^h/2$, that is, $2^{h-1}$, which indicates that half of the number of integers is included in the reduced residue class. For instance, if $m=2^8$, the reduced residue class is $R = [1,3,5,\ldots 255]$, and the integer in R can be used in the modulus $2^8$ system.

For the modulus $m = 2^h$, $l(2^h) = \psi(2^h)/2$, and the inherent quasi-primitive roots pair is known to be ±5.

Thus, for g = +5, the congruent relationship to the modulus $m = 2^8$ is, as follows:

$$+5^{\alpha'} \equiv a'(\text{mod } 2^8) \quad (20)$$

The residue a' is in the form 4n−1; where n = 1, such that $R' = [3,7,11 \ldots 253]$ and corresponds uniquely to the exponent a' less than or equal to $(2^6) = 64$.

For g = −5, a similar congruent relationship holds:

$$-5^{\alpha''} \equiv a''(\text{mod } 2^8) \quad (21)$$

The residue a" of the form 4n+1 forms the reduced residue class $R'' = [1,5,9,13,\ldots 255]$ and corresponds uniquely to the exponent $\alpha''$, which is ether less than or equal to $l(2^6) = 64$.

Thus, to make the correspondence unique for all odd integers which are less than $2^8$, a paired exponent $\alpha$, $\beta$ is considered to be an odd integer residue which is less than $2^8$, by the congruent relationship, which is as follows:

$$(-1^\beta)5^\alpha = a(\text{mod } 2^8), \beta = 0,1; 1 \leq \alpha \leq 2^6 \quad (22)$$

The exponent transform is defined so that the transform of an odd integer residue a in the reduced residue class converts uniquely into a paired exponent $\alpha$, $\beta$. Table 3 describes the exponent transform for the modulus $m = 2^h$, $h = 8$; for instance, a = 23 converts to $\alpha = 14$, $\beta = 1$. An inverse exponent transform operates vice versa. Table 4 illustrates the inverse exponent transform for the modulus $m=2^8=256$.

As an exponent transform system, a modular addition among the exponent pair corresponds to modular multiplication among the residues; thus, for $(-1)^{\beta_1}g^{\alpha_1}\equiv a_1(\mod 2^h)$, $(-1)^{\beta_2}\tilde{g}^{\alpha_2}\equiv a_2(\mod 2^h)$; and the following relationship holds:

$$(-1)^{\beta_1+\beta_2 \mod 2}\tilde{g}^{\alpha_1+\alpha_2 \mod 2^{h-2}}\equiv a_1*a_2(\mod 2^h) \quad (23)$$

If $a_1*a_2$ is larger than $2^h$ or equal to $2^h$, $$a_1*a_2 \equiv r_p \,(\mod 2^h) \quad (24)$$

Thus, the most general congruent relationship may be defined as follows:

$$(-1)^{\beta_1+\beta_2 \mod 2}\tilde{g}^{\alpha_1+\alpha_2 \mod 2^{h-2}}\equiv r_p(\mod 2^h) \quad (25)$$

Therefore, in the binary modulus $2^h$ exponent system being applied to two h-bit odd integers, the h-bit odd product residue $r_{p1}$ appears on the output. If a real product is less than or equal to the h bit, the product residue is real product.

It should be mentioned that the modulus $2^h$ exponent transform system operates only for odd integers which are less than the modulus.

Thus, the dual moduli exponent transform system shown in FIG. 2 performs a multiplication for odd integers.

If the dual moduli are $2^h$ and $2^h+1$, the subsystem of the modulus $2^h+1$ operates for odd integers, although it is capable of operating for all integers.

In the binary dual moduli system, odd binary integers are applied so that the $2^0$ bit is always 1. This means that the input integers are considered as addresses in the circuit in which the exponent transform is implemented by an ROM. The address line that is carrying $2^0$-bit information can be rejectable. Thus, the h-bit integers requires h−1 address lines because they are odd integers only. The exponent transform circuit of the $2^h+1$ modulus subsystem can be made by use of a $2^{h-1}*h$ bits ROM.

During the process of storing of the exponent transform in the ROM, some modification is required. For instance, when h=8, an integer (residue) 3, which is 00000011 in binary form, appears as 0000001 on the 7-bit address line. However, the respective exponent to 3 which is being read as 87 from Table 1 (i.e., the equivalent binary 01010111) is stored at the memory location 10000001.

In the embodiment of the $2^h$ modulus exponent subsystem of the dual moduli exponent multiplication system, the exponent transform circuits are constructed slightly different from the construction of the $2^h+1$ modulus subsystem, because an odd integer must convert to paired exponents $(\alpha,\beta)$.

One of the paired exponents, $\beta$, is either "0" or "1." Accordingly, the form of an odd integer is $4n+1$ or $4n-1$, respectively. This means that the value of $\beta$ is equal to that of a $2^1$ bit of the binary expression of the integer, for instance, for 3, $\beta=1$ and for 5, $\beta=0$.

When multiplying $a_1$ and $a_2$ (which are odd integers of either $4n-1$ or $4m+1$ form), the former form $a_1$ corresponds to exponent $\beta=1$ and to latter form $a_2$ corresponds to exponent $\beta=0$. Thus, if different forms of integers are multiplied, the product exponent is always 1, as described by the equation $(4n-1)*(4m+1)=4P-1$, where n, m and p are positive integers. If the same form of integers is multiplied, the product exponent $\beta_p$ is always 0 as indicated by $(4n-1)*(4m-1)=4P+1$. Therefore, when multiplying the respective exponents $\beta_1$, $\beta_2$ for $a_1$, $a_2$ are processed by exclusive or logic to obtain the product exponent $\beta_p$;

$$\beta_1+\beta_2=\beta_p \quad (26)$$

Or, equivalently, the product exponent $\beta_p$ is obtained by modulus 2 addition as follows:

$$\beta_1+\beta_2\equiv\beta_p(\mod 2) \quad (27)$$

Another exponent $\alpha$ of the paired exponents $(\alpha,\beta)$ is in the modulus of $2^{h-2}$, the sum exponent of $\alpha_1$, $\alpha_2$ should be in the same range. The summation is performed by a modulus $2^{h-2}$ adder and, on its output, the sum exponent appears which is an h−2 bit length.

Therefore, the paired product exponents $(\alpha_p, \beta_p)$ is determined, as follows:

$$\alpha_1+\alpha_2\equiv\alpha_p(\mod 2^{h-2})$$

$$\beta_1+\beta_2\equiv\beta_p(\mod 2) \quad (29)$$

Then, the binary $2\alpha_p+\beta_p$ has an h−1 bit length and is considered as an address applied to the inverse transform circuit constructed by a ROM or the equivalents. When a ROM is used, $2^{h-1}$ memory locations store the respective residue $r_p$'s which correspond to the respective paired product exponents $(\alpha_p, \beta_p)$ that constitute the addresses where the stored information should be read out.

The procedure mentioned above is performed by Table 4 in the case of h=8. The function of the inverse exponent transform scheme is that the paired product exponents $(\alpha_p, \beta_p)$ applied to the input are converted to the respective product residue which appears on the output of the circuit.

In the dual moduli exponent transform multiplication system, the product residues $r_{p1}$ and $r_{p2}$ are produced from the $2^h$ modulus subsystem and the $2^h+1$ modulus subsystem, respectively. These residues are applied to the auxiliary circuit that is developed from the fundamental relationship of equation (18), from which the real product is obtained.

FIG. 2 shows a preferred embodiment of the invention. In FIG. 2, the exponent transform circuits 1 and 2 convert the h-bit odd input integer into the corresponding exponent, which is denoted as $\alpha$. One of the paired exponents $(\alpha, \beta)$ has an h−2 bit length. When multiplying two h-bit odd integers $a_1$, $a_2$ (FIG. 2). They are addresses which may be applied to the respective exponent circuits. Then the transform circuit 1 and 2 read out the data stored at these addresses and thereby generate the respective exponents $\alpha_1$, $\alpha_2$. Instantly, these exponents are summed by the h−2 bit adder 3 in order to generate the h=2 bit sum exponent, which also denotes the product exponent $\alpha_p$. Simultaneously, the exclusive OR gate 5 takes in the bit information on the $2^1$ bit line, which is an h−1 bit length address line pair carrying the multiplying odd integers, respectively. On its $2^1$ bit inputs, the exclusive OR gate generates the other exponent $\beta_p$ of the paired exponents $(\alpha_p, \beta_p)$, which is denoted as a product exponent product. The paired exponents thus obtained are applied as an address to the inverse exponent transform circuit 4 which converts the input exponent integer to the respective product residue. If the paired product exponents ($\alpha_p$, $\beta_p$) are applied to the transform circuit 4, then the product residue $r_{p1}$ appears, which relates to the real product $a_1$ jx $a_2$ as follows:

$a_1 \times a_2 = r_p + k \times 2^h$ k; positive integer.

Although the generated residue product $r_{p1}$ is less than $2^h$, the generated product residue $r_{p1}$ can be used to obtain the real product. The lower portion 10B of FIG. 2 (enclosed by the dashed lines) illustrates the modulus $2^h+1$ exponent transform subsystem. The exponent transform circuits 6 and 7 can be ROM's or the equivalents. The two h-bit odd integers and h−1 bit lines are applied to the respective exponent transform circuits 6,7 which are connected in parallel (in reality, 2° bit portions are always 1). These two odd integers are used as ROM addresses. The respective exponents $\alpha,\beta$ appear at the respective output terminals of circuits 6 and 7. The exponents are summed by the h-bit adder 8 for generating a sum exponent $S_r$. This sum exponent is applied to the inverse transform circuit 9. Then, the product residue $r_{p2}$ appears on the output of inverse transform circuit 9 and it is also h-bit wide. Thus, two product residues of h-bit wide are obtained for the h-bit multiplicand $a_1$ and multiplier $a_2$.

The outside portions of the dashed line enclosures 10A, 10B (FIG. 2) illustrate the circuit derived from the basic relationship of equation (18). This inventive circuit is indispensable to complete the h-by-h bit multiplication system by a number size which is limited to h-bit wide.

Thus, if the dual moduli system uses a number size being "h," the real product is obtained with a 2h-bit length. This means that there is a remarkable reduction in the size of the ROM and that a high multiplication speed is possible.

Complementor 12 is a 2's complementor for the product residue $r_{p2}$ of h-bit wide, and for the product residue $r_{p1}$ of the $2^h$ modulus exponent system. The complemented residue product $r_{p2}$ is summed by the modulus $2^h$ adder 10, thereby giving $[r_{p1}-r_{p2}(\bmod 2^h)]$. The h-bit adder 10 output is connected to the more significant addend terminal of the 2h-bit adder 11, while holding augend terminal as 0. At the same time, the h-bit adder output and the output of the modulus $2^h+1$ system 10B are connected to the less significant addend and the less significant augend terminals of adder 11, respectively. When the multiplicand $a_1$ and the multiplier $a_2$ are applied, the real product appears on the output of the 2h-bit adder 11 after the sum time equal to twice the access time of the ROM's and the adder delays.

The dual moduli multiplier for h=8 is constructed by EPROM's 2708 Intel for exponent and inverse transform, which has an ROM with only 5898 bits. The adders are constructed by cascading 4 bit adders, such as SN 74283 (Texas Instruments). The correct operation is reliable and the multiplication speed is 1.2 microsecond due to the slow access time (450 ns) of the 2708 EPROM's. An example of a manual calculation conducted by the dual system will help to understand the invented principles:

Multiply 21 and 23. At first, the product residue $r_{p1}$ of $2^h$ system is derived as follows: (1) given $a_1=21$, $a_2=23$; (2) from Table 3 find that $\alpha_1=45$, $\beta_1=0$; $\beta_2=14$; $\beta_2=1$; (3) then exponent mod addition follows; $\alpha_1+\alpha_2=5-9=\alpha_p\beta_1+\beta_2=1=\beta_p$. Thus, the exponent product pair $(\alpha_p, \beta_p)=(59, 1)$. Hence, from Table 4, note that the product residue for $2^8$ system $r_{p1}=227$. Next, for $2^8+1=257$ system, $\alpha=58$, $\beta=132$ for the respective $a_1$ and $a_2$. Sum the exponents with modulus 256, $58+132=190$. From Table 2, find the resulting product residue $r_{p2}=226$.

Finally, $[r_{p1}-r_{p2} (\bmod 256)]=227-226(\bmod 256)=1$, $[r_{p1}-r_{p2}(\bmod 256)]2^8=1*256=256$, $r_{p2}=226$; summing $1+256+226=483=21*23$.

A further improvement (FIG. 3) of the dual moduli exponent transform multiplier system is achieved in the subsystem with the modulus $2^h$ (FIG. 2).

The h-1-bit lines on which an odd multiplicand and a multiplier appear are separated into the higher h-2 bit lines and the $2^1$ bit line. By this separation, the bit sizes of the exponent transform ROM's and the inverse exponent transform ROM's are reduced to $2^{h-2}$ x (h−2) bits, respectively.

However, it becomes necessary to provide two demultiplexers 13, 14 which precede the respective exponent transform ROM's 15, 16 for a multiplicand and a multiplier and, further, to provide a demultiplexer 17 following the inverse exponent transform ROM 18. These demultiplexers are controlled by $\beta$ which is one of the exponent pair ($\alpha$, $\beta$).

FIG. 3 shows a block diagram of the multiplication system of modulo $2^h$ for odd integers in which the partitioning of the h−1 bit lines reduces the transform ROM's size and improves the performance of the system.

The odd multiplicand is supplied to the h−1 bit terminal T1, and an odd multiplier is supplied to the terminal T2. The input lines of these terminals are partitioned between the higher h−2 bit lines and the lower $2^1$ bit lines. The higher h−2 bit lines are applied over data busses to the respective demultiplexers 13, 14. The $2^1$ bit lines are applied to respective select terminals S1, S2. The signal $\beta_1$ appears at terminal S1 and automatically selects either the direct or the inverted output terminals OT1, OT2 of the demultiplexer 13. The signal $\beta_2$ appearing at demultiplexer 14 selects either the direct or inverted output terminal OT3, OT4 of the demultiplexer 14. The output signals from these respective demultiplexers output terminals are fed to the respective exponent transform ROM's 15, 16. The outputs of these ROM's are the respective exponents $\alpha_1$, $\alpha_2$ which are applied to the modulo $2^{h-2}$ adder 20.

On the output terminal of the adder 20 appears the sum exponent $\alpha$ which is applied to the inverse exponent transform ROM 18 as an address. Responsive to the signals $\beta_1$ and $\beta_2$, the sum exponent modulo 2 denoting $\beta_p$ appears on the output of the exclusive OR circuit 19.

The output of the ROM 18 is fed as input data to the demultiplexer 17, and the sum exponent $\beta_p$ at the select terminal S3 selects either the direct or inverted output terminal OT5, OT6 of the demultiplexer 17. A correct odd product residue is given from the output of the demultiplexer 17 and the output of the exclusive OR 19.

The basic idea behind the operation of FIG. 3 can be understood easily by considering a specific example.

From Table 4, an exponent $\alpha$ of the paired exponents ($\alpha+\beta$) corresponds to two residues. For example, if $\alpha=30$, the residue corresponds to 169 and $\beta=0$; if $\beta=1$, it corresponds to 87.

The binary forms (h=8) for these residues are 10101001, 01010111, respectively. Observe that the higher h−2 bit patterns of the two residues are inverted, and also the $2^1$ bit, that is, $\beta$ of them is inverting.

Therefore, if the higher $h-2$ bit portion of the odd residue "a" (which is an integer of h-bit length) is denoted as $\overline{H(a)}$, then the following relationship holds:

$$H(a) = \overline{H(2^h - a)}; \text{ a: odd residue modulo } 2^h \tag{30}$$

$$(-1)^\beta g^\alpha \equiv a \pmod{2^h} \alpha: \text{ exponent, mod } 2^h/2 \tag{31}$$

$$(-1)^{1-\beta} g^\alpha \equiv 2^h - a \pmod{2^h} \beta: \text{ exponent mode 2}$$

According to the result just mentioned, if the exponent transform ROM for the exponent $\alpha$ is constructed by the residue "a" for which $\beta$ is "0" as an address, the total number of the memory location is $2^{h-2}$. The exponent $\alpha$ for the residue "a" is stored in the location indicated by the address of "a." The bit length of the exponent $\alpha$ is $h-2$, so that the bit size of the exponent transform ROM is $2^{h-2} \times (h-2)$.

Although an odd residue for which $\beta$ is "0" can be directly applied to the exponent transform ROM, an odd residue for which $\beta$ is "1" must be inverted in its higher $h-2$ bit portion before addressing. This manipulation is implemented by a demultiplexer controlled by $\beta$, that is, the $2^1$ bit of the applied residue.

In this way, at first, an odd multiplicand $a_1$ and an odd multiplier $a_2$ are applied as respective residues to the respective demultiplexers which are respectively controlled by $\beta_1$, $\beta_2$ which equal the $2^1$ bit of $a_1$, $a_2$, respectively.

The higher $h-2$ bit portion of a residue "a," that is, $H(a)$, is applied to the demultiplexer. If $\beta$ of the residue "A" is "0," the output of the demultiplexer 14 is the same as its input: $H(a)$. If $\beta$ of the input residue "a" is 1, then the output is the inverted one of the inputs: $\overline{H(a)}$ which corresponds to the residue $2^h - a$, which has $\beta$ equal to "0."

For instance, if $\beta_2$ of a multiplier $a_2$ is "1," the demultiplexer 14 outputs the inverted $\overline{H(a_2)}$, which is applied as an address to the exponent transform ROM. After the access time of the exponent transform ROM, the corresponding exponent $\alpha_2$ appears on the data bus of the ROM, which is fed to the augend terminals of an $h-2$ bit adder.

Thus, when the odd integers are applied to the respective demultiplexers 13, 14 and exponent transform ROM's 15, 15 utilizing the respective higher $h=2$ bit bit portions of $a_1$, $a_2$, the corresponding exponents $\alpha_1$, $\alpha_2$ appear.

In the next description, the separately obtained exponents $\alpha_1$, $\alpha_2$ and $\beta_1$, $\beta_2$ are processed, as follows:

$$\alpha_1 + \alpha_2 \equiv \alpha_p \pmod{2^h - 2}$$

$$\beta_1 + \beta_2 \equiv \beta_p \pmod{2}$$

wherein the latter ($\beta$ addition) is performed by an exclusive OR gate 19 and the ($\alpha$ addition) by an $h-2$ bit adder 20.

Finally, the sum exponent $\alpha_p$ modulo $2^{h-2}$ is applied to the inverse exponent transform ROM 18 which is constructed by storing, at an address specified by $\alpha_p$, the higher $h-2$ bit portion of the corresponding residue $a_p$; for $\beta = $ "0" as described by the following Table 4. If $\beta_p$ is "0," then the output of the inverse exponent transform ROM 18 gives a correct higher $h-2$ bit portion of the product residue. However, if $\beta_p$ is 1, then the output must be inverted to attain a correct result.

Therefore, the inverse transform ROM 18 is followed by a demultiplexer 17 which controls its output responsive to the signal $\beta_p$. A correct higher $h-2$ bit pattern is obtained on the output of the demultiplexer 17 and the signal $\beta_p$ is a correct $2^1$ bit of the product residue modulo $2^h$.

Therefore, the above-mentioned subsystem to the modulus $2^h$ provides a product residue modulo $2^h$, when two odd integers are being multiplied. The dual moduli exponent transform multiplication system can be efficiently implemented by reduced ROM memory size. For instance, in the 8 bits by 8 bits odd integer multiplier, the subsystem moduluo $2^8$ requires three ROM's having $64 \times 6$ bits each.

However, the above-mentioned dual moduli exponent transform multiplier can only multiply odd binary integers, so that a compensation is necessary in order to multiply every integer of the same bit length.

FIG. 4 shows a diagram for such a compensating system. In the diagram, the dual moduli exponent transform multiplier 31 follows pre-shift circuits 32 for moving the input signal to the right and precedes a post-shift circuit 33 for moving the output signal back to the left circuit 33.

The right shift registers 34, 35 operate a number of times to make an i, j right shift of a multiplicand and a multiplier, which shifts are applied serially, until $2^0$ bits of them become "1." Thus, odd numbers are obtained in the shift registers 34, 35. These odd numbers are applied in parallel to the multiplicand and multiplier terminals, respectively, of the odd multiplication system 31.

After processing by "1," an odd product is generated and serially applied to the left shift register 33 which contains a correct product after $i + j$ shifts to the left, for undoing the i, j right shift which occurred in registers 34, 35.

An odd multiplier body 31 and a compensating circuit 32 operate simultaneously and asynchronously. No outputs from the right shift registers 32 are applied through dual moduli multiplier 31 and on to a final adder 33 which gives a correct product for every integer being multiplied, including zeros.

Therefore, a multiplier that includes this compensating circuit, as an integral portion of the system, can operate for every integer being multiplied. These integers are of the same bit length and may be zeros. This circuit is one of the preferred embodiments of the invention. A detailed description of it follows.

The multiplier 31 is composed of dual moduli subsystems with the prime $2^h + 1$ and $2^h$ modulus, respectively. The distinctive feature of the invention is that both subsystems are composed of exponent transform type multipliers for computing respective product residues, when two odd integers of an h-bit length are being multiplied. In the binary integer form, if the integer is odd, then $2^0$ bit is always "1." Therefore, higher $h-1$ bits of the integer are required for the multiplier, if the binary numbers are odd. This lets them be carried on the higher $h-1$ lines which are applied to the odd multiplier.

Let X and Y be the two positive integers of h-bit length being multiplied. They may be either odd or even, and their product is denoted as XY, which is a 2h-bit integer.

Accordingly, as the X and Y may be either odd or even, the numbers applied to the multiplier body are automatically determined as follows:

(a) If X and Y are both odd, X and Y are applied to the multiplier for directly providing a product XY.

(b) If X is even and Y is odd, then X+1 and Y are applied to the multiplier, thereby producing product (X+1)Y.

(c) If X is odd and Y is even, then X and Y+1 are applied to the multiplier, thereby producing a product X(Y+1).

(d) If X and Y are both even, then X+1 and Y+1 are applied to the multiplier, for providing a product (X+1)(Y+1).

(e) If X is zero and Y is odd, then 1 and Y are applied to the multiplier, thus providing a product Y.

(f) If X is zero and Y is even, then 1 and Y+1 are applied to the multiplier, for providing a product X+1.

(g) If X is odd and Y is zero, then X and 1 are applied to the multiplier, in order to provide a product X.

(h) If X is even and Y is zero, then X+1 and 1 are applied to the multiplier and the product is X+1.

(i) If X and Y are both zeros, then 1 and 1 are applied to the multiplier to produce a product "1."

One of the above-mentioned products from the multiplier is obtained on the final 2h-bit adder 33, when no corrections are made.

FIG. 5 uses the compensating circuit 42 to perform the appropriate corrections, automatically. Circuit 42 operates concurrently with the computation of the multiplier 41.

The correcting operations performed by compensating circuit 42 may be expressed mathematically as indicated by the dashed underline portions of the following equations which correspond to the examples (a) to (i) above:

(a) $XY = XY - 0$
(b) $XY = (X+1)Y - Y$
(c) $XY = X(Y+1) - X$
(d) $XY = (X+1)(Y+1) - X - Y - 1$
(e) $XY = 1Y - Y$
(f) $XY = 1(Y+1) - Y - 1$
(g) $XY = X \cdot 1 - X$
(h) $XY = (X+1) \cdot 1 - X - 1$
(i) $XY = 1 \times 1 - 1$ As shown in the preferred embodiment (FIG. 6), the invention has three portions. The first portion 51–63 is an odd integer multiplier which had already been explained in detail. The second portion 75–80 (enclosed in a dashed line box) is an integral compensating circuit which extends the range of the two integers which may be multiplied. The third portion 64 is a final adder which makes final corrections by combining the binary signals from the first and second portions.

The second integral portion 75–80 is composed of two multiplexers 75, 76, an adder 77, and several simple logic gates 78–80. Each of the multiplexers 75, 76 has two inputs and one output, and is composed of h-bit lines. One input is marked with a prefix signal which is to be used for applying one of the two integers X, Y being multiplied. Another input is held in the zero bits state. One output is equal to either input according to the select code terminal state.

The $2^0$ bit codes of X and Y are applied to the respective select code terminals of the multiplexers.

In the multiplexer 75, for the input X, the output is equal to X or 0, depending upon whether the select terminal is marked by a "0" or "1," that is, $2^0$ bit of X takes 0 or 1. Therefore, if X is even, then the output of multiplexer is X. If X is odd, the output is 0.

The same relationship also holds for the multiplexer 76, for the input Y.

These outputs from the multiplexers are applied respectively to the augend and addend terminals of an h-bits adder 77. The sum bits of the adder 77 can be made equal to the correcting terms in the equation (32).

However, a number given by the sum bits is really a sum residue modulo $2^h$, when using an h-bit adder. It differs from a real sum when it is greater than $2^h$.

It should be mentioned that a carry-out bit from the adder 77 must be considered in order to correct the odd product from the multiplier body. This overflow carry of the binary adder occurs if the sum of the correcting term of equation (32) becomes greater than $2^h$.

In general, the correcting operation performed herein is basically a subtraction; therefore, the correcting operation is a complemented addition modulo $2^{2h}$.

For instance, the correcting operation indicated by (b) of equation (32):

$$XY = (X+1)Y - Y = (X+1)Y + \overline{OY} + 1 = (X+1)Y + FF\overline{Y} + 1 \tag{33}$$

wherein X,Y,O are h-bit binary numbers, h=8, and F is a hexadecimal number. In this case, no overflow occurs in the above-mentioned adder. However, in the case of (d), the correcting operation changes, according to the carry-out conditions:

$$XY = (X+1)(Y+1) - X - Y - 1 = (X+1)(Y+1) + 0(X+Y+1) + 1 \tag{34}$$

Let the sum $X + Y + 1$ modulo $2^h$ (h=8) be S; then, $X + Y + 1 \equiv S \pmod{2^h}$. If carryout occurs, the $2^h$ bit is 1. If carryout does not occur, then the $2^h$ bit is zero. Therefore, when complemented, the sum modulo $2^h$ is complemented as $\overline{S}$, and the carryout bit is also complemented.

Consequently, the correction term expressed in 2h-bit length is:

(1) If carryout occurs: $\overline{0(X+Y+1)} + 1 = FE\overline{S} + 1$; $XY = (X+1)(Y+1) + FE\overline{S} + 1$ (2) If carryout does not occur: $\overline{0(X+Y+1)} + 1 = FF\overline{S} + 1$;

FIG. 6 shows a detailed diagram of the compensated multiplication system operating for every integer of h-bit length. In this case, h is equal to 8.

The portion enclosed by the dashed line is the compensating circuit added as the integral portion. The other portion is the odd multiplier. However, the 2h-bit adder 64 is used in common with the multiplier and the compensating circuit to obtain a correct product by applying signals from both portions.

In the odd multiplier, the respective higher h-1 bit portions of X,Y numbers being multiplied are applied to the respective exponent transform ROM's 51, 52 in the modulus $2^h + 1$ (257, for h=8) subsystem. Simultaneously, they are applied to the respective exponent transform ROM's in the modulus $2^h$ subsystem. Next, both exponents from the ROM's 51, 52 are applied to the h-bit adder 53 which generates a sum exponent modulo $2^h$. Then, it is applied to the inverse exponent transform ROM 54 which generates the product residue $r_{p2}$, that is, a product residue modulo $2^h + 1$. On the other hand, both exponents generated from the ROM's 55, 56 are applied to the h-2 bit adder 57 which generates a sum exponent $\alpha_p$ modulo $2^{h-2}$. At the same time, the $2^1$ bit lines of X, Y are carrying the signals $\beta_x$, $\beta_y$, respectively. They are applied to the exclusive OR gate 58 which generates a sum exponent $\beta_p$, which has modulo 2.

The numbers are arranged in their order $\alpha_p$, $\beta_p$ and are applied as an address to the inverse exponent transform ROM 59 which generates a product residue $r_{p1}$ modulo $2^h$. To obtain a correct product of the odd multiplier body, the subsystem is constructed from the complementor 61, the h-bit adders 60, 62, 63, and the 2h-bit adder 64. Extra adders 62, 63 are required because the adder 64 is used also as a correction adder.

The subsystem combines the product residues with different moduli which were previously obtained by following the relationship set forth in equation (18). The complementor 61 and the adder 60 perform the subtraction such as $(r_{p1}-r_{p2})$ mod $2^h$. The h-bit adders perform the addition indicated in equation (18).

The resulting two sums of h-bit length are applied to the higher one of the lowr augend terminals of the 2h-bit adder 64 which is used in common with the compensating circuit, thereby generating a correct product for X and Y.

The compensating circuit comprises the two multiplexers 75, 76 for the two integers X, Y, respectively. The operation of the multiplexers had already been explained in detail. Their outputs are applied to h-bit adder 77. The resulting output is inverted by the complementor 79. Then, it is applied to the lower h-bit portion of the addend terminal of the 2h-bit adder 64, which is used in common. The NOR gate 78 manipulates the operations indicated by the relationship of equation (32).

For instance, when both X, Y are even, the operation $X+Y+1$ must be performed in the adder 77, as shown by (d) of equation (32). In this case, both $2^0$ bits of X, Y indicates 0's, so that the NOR gate 78 output is "1." This is applied to the carry-in terminal of the adder 77, in which X and Y are applied to the augend and addend terminals respectively. The carryout terminal of the adder 77 is connected to the bit complementor 80, the output of which is applied to the least significant bit terminal ($2^h$ bit position) of the higher h-bit portion of the addend terminal. This connection conforms the relationship considered in equation (35).

An example will clarify the above automatic calculation:

Multiply 200 and 170: Both numbers are even, so the case is (d) of equation (32). From equation (35), the output of the multiplier body is $201\times171=34371=8643(H)$. In the addition $X+Y+1=200+170+1=371$, 371 is greater than 256 ($2^8$). Carryout occurs and the sum modulo 256 is 115 $(371-256)=73(H)$. Therefore, $\overline{S}=73(H)$; $S=8D(H)$. A correct product in hexadecimal is $8643+FE8D+1=8\text{-}4D0$ (mod $2^{16}$); hence, the correct product in decimal is 34000, which is found from a hexadecimal conversion Table.

One more example: $000\times255$; the odd multiplier body output is 255, which is equal in hexadecimal to 00FE(H). This case is (e) of equation (32). The final product in hexadecimal is $00FE+FF01+1=10000(H)$; therefore, 0000 (mod $2^{16}$) is being provided on the sum terminal of the final adder.

As shown in these examples, a correct product always is provided on the sum terminal of the final 2h-bit adder 64.

The multiplication speed is almost equal to that of the odd multiplier body, because the integral compensating scheme delay time is much smaller.

The integrated multiplier of the compensating circuit can multiply, error-free and at high speed in an asynchronous mode. This is one of the embodiments of the inventions.

Table 1 is an exponent transform table in which a residue with the modulus $2^8+1$, that is, 257 corresponds to an exponent of the primitive root 10 which is inherent to the prime 257.

Table 2 is an inverse exponent transform Table in which an exponent with the modulus 256 corresponds to a residue with the modulus 257.

Table 3 is an exponent transform Table in which an odd residue with 256 corresponds to a paired exponent ($\alpha$, $\beta$) having the respective moduli 64 and 2.

Table 4 is an inverse exponent transform Table in which a paired exponent corresponds to an odd integer residue.

These Tables may be slightly modified to be able to store them in ROM's with a finite 8-bit word, if numbers are transformed to their binary forms.

TABLE 1

| Residue | Exponent | Residue | Exponent | Residue | Exponent | Residue | Exponent |
|---|---|---|---|---|---|---|---|
| 1 | 0 | 65 | 183 | 129 | 176 | 193 | 96 |
| 2 | 80 | 66 | 67 | 130 | 7 | 194 | 17 |
| 3 | 87 | 67 | 252 | 131 | 97 | 195 | 14 |
| 4 | 160 | 68 | 104 | 132 | 147 | 196 | 102 |
| 5 | 177 | 69 | 219 | 133 | 94 | 197 | 40 |
| 6 | 167 | 70 | 228 | 134 | 76 | 198 | 154 |
| 7 | 227 | 71 | 101 | 135 | 182 | 199 | 194 |
| 8 | 240 | 72 | 158 | 136 | 184 | 200 | 82 |
| 9 | 174 | 73 | 244 | 137 | 120 | 201 | 83 |
| 10 | 1 | 74 | 189 | 138 | 43 | 202 | 205 |
| 11 | 156 | 75 | 185 | 139 | 234 | 203 | 213 |
| 12 | 247 | 76 | 27 | 140 | 52 | 204 | 191 |
| 13 | 6 | 77 | 127 | 141 | 18 | 205 | 38 |
| 14 | 51 | 78 | 173 | 142 | 181 | 206 | 159 |
| 15 | 8 | 79 | 122 | 143 | 162 | 207 | 50 |
| 16 | 64 | 80 | 241 | 144 | 238 | 208 | 70 |
| 17 | 200 | 81 | 92 | 145 | 163 | 209 | 23 |
| 18 | 254 | 82 | 197 | 146 | 68 | 210 | 59 |
| 19 | 123 | 83 | 25 | 147 | 29 | 211 | 84 |
| 20 | 81 | 84 | 218 | 148 | 13 | 212 | 223 |
| 21 | 58 | 85 | 121 | 149 | 37 | 213 | 188 |
| 22 | 236 | 86 | 169 | 150 | 9 | 214 | 217 |
| 23 | 132 | 87 | 73 | 151 | 15 | 215 | 10 |
| 24 | 71 | 88 | 140 | 152 | 107 | 216 | 245 |
| 25 | 98 | 89 | 170 | 153 | 118 | 217 | 33 |
| 26 | 86 | 90 | 175 | 154 | 207 | 218 | 221 |
| 27 | 5 | 91 | 233 | 155 | 239 | 219 | 75 |
| 28 | 131 | 92 | 36 | 156 | 253 | 220 | 237 |
| 29 | 242 | 93 | 149 | 157 | 130 | 221 | 206 |
| 30 | 88 | 94 | 11 | 158 | 202 | 222 | 20 |
| 31 | 62 | 95 | 44 | 159 | 150 | 223 | 152 |
| 32 | 144 | 96 | 231 | 160 | 65 | 224 | 115 |
| 33 | 243 | 97 | 193 | 161 | 103 | 225 | 16 |
| 34 | 24 | 98 | 22 | 162 | 172 | 226 | 190 |
| 35 | 148 | 99 | 74 | 163 | 139 | 227 | 216 |
| 36 | 78 | 100 | 2 | 164 | 21 | 228 | 114 |
| 37 | 109 | 101 | 125 | 165 | 164 | 229 | 3 |
| 38 | 203 | 102 | 111 | 166 | 105 | 230 | 133 |
| 39 | 93 | 103 | 79 | 167 | 47 | 231 | 214 |
| 40 | 161 | 104 | 246 | 168 | 42 | 232 | 226 |
| 41 | 117 | 105 | 235 | 169 | 12 | 233 | 199 |
| 42 | 138 | 106 | 143 | 170 | 201 | 234 | 4 |
| 43 | 89 | 107 | 137 | 171 | 41 | 235 | 108 |
| 44 | 60 | 108 | 165 | 172 | 249 | 236 | 186 |
| 45 | 95 | 109 | 141 | 173 | 90 | 237 | 209 |
| 46 | 212 | 110 | 157 | 174 | 153 | 238 | 251 |
| 47 | 187 | 111 | 196 | 175 | 69 | 239 | 126 |
| 48 | 151 | 112 | 35 | 176 | 220 | 240 | 72 |
| 49 | 198 | 113 | 110 | 177 | 113 | 241 | 192 |
| 50 | 178 | 114 | 34 | 178 | 250 | 242 | 136 |
| 51 | 31 | 115 | 53 | 179 | 45 | 243 | 179 |
| 52 | 166 | 116 | 146 | 180 | 255 | 244 | 134 |
| 53 | 63 | 117 | 180 | 181 | 155 | 245 | 119 |
| 54 | 85 | 118 | 106 | 182 | 57 | 246 | 28 |
| 55 | 77 | 119 | 171 | 183 | 61 | 247 | 129 |

TABLE 1-continued

| Residue | Exponent | Residue | Exponent | Residue | Exponent | Residue | Exponent |
|---|---|---|---|---|---|---|---|
| 56 | 211 | 120 | 248 | 184 | 116 | 248 | 46 |
| 57 | 210 | 121 | 56 | 185 | 30 | 249 | 112 |
| 58 | 66 | 121 | 54 | 186 | 229 | 250 | 99 |
| 59 | 26 | 123 | 204 | 187 | 100 | 251 | 39 |
| 60 | 168 | 124 | 222 | 188 | 91 | 252 | 49 |
| 61 | 230 | 125 | 19 | 189 | 232 | 253 | 32 |
| 62 | 142 | 126 | 225 | 190 | 124 | 254 | 215 |
| 63 | 145 | 127 | 135 | 191 | 195 | 255 | 208 |
| 64 | 224 | 128 | 48 | 192 | 55 | | |

Merely for convenience of readily implementing such an ROM, the indices, such as x, y and s, calculated for the residues X, Y and XY by the use of the modulus 257 are listed in Table 2 below. It is possible to understand that Table 2 gives a numerical example of the one-to-one correspondence between the consecutive whole numbers x, y and s and the consecutive integers X, Y and XY, with the indices x, y and s arranged in the ascending order except for the index 0.

Such a table is readily obtained by calculating:

$10^0 = 1$,
$10^1 = 10$,
$10^2 = 100$,
$10^3 = 257 \times 3 + 229$  229 (mod 257),
$10^4 = 257 \times 38 + 234$  234 (mod 257)

TABLE 2

| Exponent | Residue | Exponent | Residue | Exponent | Residue | Exponent | Residue |
|---|---|---|---|---|---|---|---|
| 1 | 10 | 65 | 160 | 129 | 247 | 193 | 97 |
| 2 | 100 | 66 | 58 | 130 | 157 | 194 | 199 |
| 3 | 229 | 67 | 66 | 131 | 28 | 195 | 191 |
| 4 | 234 | 68 | 146 | 132 | 23 | 196 | 111 |
| 5 | 27 | 69 | 175 | 133 | 230 | 197 | 82 |
| 6 | 13 | 70 | 208 | 134 | 244 | 198 | 49 |
| 7 | 130 | 71 | 24 | 135 | 127 | 199 | 233 |
| 8 | 15 | 72 | 240 | 136 | 242 | 200 | 17 |
| 9 | 150 | 73 | 87 | 137 | 107 | 201 | 170 |
| 10 | 215 | 74 | 99 | 138 | 42 | 202 | 158 |
| 11 | 94 | 75 | 219 | 139 | 163 | 203 | 38 |
| 12 | 169 | 76 | 134 | 140 | 88 | 204 | 123 |
| 13 | 148 | 77 | 55 | 141 | 109 | 205 | 202 |
| 14 | 195 | 78 | 36 | 142 | 62 | 206 | 221 |
| 15 | 151 | 79 | 103 | 143 | 106 | 207 | 154 |
| 16 | 225 | 80 | 2 | 144 | 32 | 208 | 255 |
| 17 | 194 | 81 | 20 | 145 | 63 | 209 | 237 |
| 18 | 141 | 82 | 200 | 146 | 116 | 210 | 57 |
| 19 | 125 | 83 | 201 | 147 | 132 | 211 | 56 |
| 20 | 222 | 84 | 211 | 148 | 35 | 212 | 46 |
| 21 | 164 | 85 | 54 | 149 | 93 | 213 | 203 |
| 22 | 98 | 86 | 26 | 150 | 159 | 214 | 231 |
| 23 | 209 | 87 | 3 | 151 | 48 | 215 | 254 |
| 24 | 34 | 88 | 30 | 152 | 223 | 216 | 227 |
| 25 | 83 | 89 | 43 | 153 | 174 | 217 | 214 |
| 26 | 59 | 90 | 173 | 154 | 198 | 218 | 84 |
| 27 | 76 | 91 | 188 | 155 | 181 | 219 | 69 |
| 28 | 246 | 92 | 81 | 156 | 11 | 220 | 176 |
| 29 | 147 | 93 | 39 | 157 | 110 | 221 | 218 |
| 30 | 185 | 94 | 133 | 158 | 72 | 222 | 124 |
| 31 | 51 | 95 | 45 | 159 | 206 | 223 | 212 |
| 32 | 253 | 96 | 193 | 160 | 4 | 224 | 64 |
| 33 | 217 | 97 | 131 | 161 | 40 | 225 | 126 |
| 34 | 114 | 98 | 25 | 162 | 143 | 226 | 232 |
| 35 | 112 | 99 | 250 | 163 | 145 | 227 | 7 |
| 36 | 92 | 100 | 187 | 164 | 165 | 228 | 70 |
| 37 | 149 | 101 | 71 | 165 | 108 | 229 | 186 |
| 38 | 205 | 102 | 196 | 166 | 52 | 230 | 61 |
| 39 | 251 | 103 | 161 | 167 | 6 | 231 | 96 |
| 40 | 197 | 104 | 68 | 168 | 60 | 232 | 189 |
| 41 | 171 | 105 | 166 | 169 | 86 | 233 | 91 |
| 42 | 168 | 106 | 118 | 170 | 89 | 234 | 139 |
| 43 | 138 | 107 | 152 | 171 | 119 | 235 | 105 |
| 44 | 95 | 108 | 235 | 172 | 162 | 236 | 22 |

TABLE 2-continued

| Exponent | Residue | Exponent | Residue | Exponent | Residue | Exponent | Residue |
|---|---|---|---|---|---|---|---|
| 45 | 179 | 109 | 37 | 173 | 78 | 237 | 220 |
| 46 | 248 | 110 | 113 | 174 | 9 | 238 | 144 |
| 47 | 167 | 111 | 102 | 175 | 90 | 239 | 155 |
| 48 | 128 | 112 | 249 | 176 | 129 | 240 | 8 |
| 49 | 252 | 113 | 177 | 177 | 5 | 241 | 80 |
| 50 | 207 | 114 | 228 | 178 | 50 | 242 | 29 |
| 51 | 14 | 115 | 224 | 179 | 243 | 243 | 33 |
| 52 | 140 | 116 | 184 | 180 | 117 | 244 | 73 |
| 53 | 115 | 117 | 41 | 181 | 142 | 245 | 216 |
| 54 | 122 | 118 | 153 | 182 | 135 | 246 | 104 |
| 55 | 192 | 119 | 245 | 183 | 65 | 247 | 12 |
| 56 | 121 | 120 | 137 | 184 | 136 | 248 | 120 |
| 57 | 182 | 121 | 85 | 185 | 75 | 249 | 172 |
| 58 | 21 | 122 | 79 | 186 | 236 | 250 | 178 |
| 59 | 210 | 123 | 19 | 187 | 47 | 251 | 238 |
| 60 | 44 | 124 | 190 | 188 | 213 | 252 | 67 |
| 61 | 183 | 125 | 101 | 189 | 74 | 253 | 156 |
| 62 | 31 | 126 | 239 | 190 | 226 | 254 | 18 |
| 63 | 53 | 127 | 77 | 191 | 204 | 255 | 180 |
| 64 | 16 | 128 | 0 | 192 | 241 | 0 | 1 |

TABLE 3

| Residue | Exponent 1 | Exponent 2 | Residue | Exponent 1 | Exponent 2 | Residue | Exponent 1 | Exponent 2 |
|---|---|---|---|---|---|---|---|---|
| 1 | 64 | 0 | 85 | 29 | 0 | 171 | 29 | 1 |
| 3 | 35 | 1 | 87 | 30 | 1 | 173 | 39 | 0 |
| 5 | 1 | 0 | 89 | 50 | 0 | 175 | 12 | 1 |
| 7 | 10 | 1 | 91 | 57 | 1 | 177 | 52 | 0 |
| 9 | 6 | 0 | 93 | 43 | 0 | 179 | 31 | 1 |
| 11 | 21 | 1 | 95 | 24 | 1 | 181 | 37 | 0 |
| 13 | 47 | 0 | 97 | 40 | 0 | 183 | 54 | 1 |
| 15 | 36 | 1 | 99 | 27 | 1 | 185 | 26 | 0 |
| 17 | 28 | 0 | 101 | 9 | 0 | 187 | 49 | 1 |
| 19 | 23 | 1 | 103 | 34 | 1 | 189 | 51 | 0 |
| 21 | 45 | 0 | 105 | 46 | 0 | 191 | 48 | 1 |
| 23 | 14 | 1 | 107 | 13 | 1 | 193 | 16 | 0 |
| 25 | 2 | 0 | 109 | 55 | 0 | 195 | 19 | 1 |
| 27 | 41 | 1 | 111 | 60 | 1 | 197 | 17 | 0 |
| 29 | 59 | 0 | 113 | 4 | 0 | 199 | 58 | 1 |
| 31 | 8 | 1 | 115 | 15 | 1 | 201 | 22 | 0 |
| 33 | 56 | 0 | 117 | 53 | 0 | 203 | 5 | 1 |
| 35 | 11 | 1 | 119 | 38 | 1 | 205 | 63 | 0 |
| 37 | 25 | 0 | 121 | 42 | 0 | 207 | 20 | 1 |
| 39 | 18 | 1 | 123 | 33 | 1 | 209 | 44 | 0 |
| 41 | 62 | 0 | 125 | 3 | 0 | 211 | 7 | 1 |
| 43 | 61 | 1 | 127 | 32 | 1 | 213 | 61 | 0 |
| 45 | 7 | 0 | 129 | 32 | 0 | 215 | 62 | 1 |
| 47 | 44 | 1 | 131 | 3 | 1 | 217 | 18 | 0 |
| 49 | 20 | 0 | 133 | 33 | 0 | 219 | 25 | 1 |
| 51 | 63 | 1 | 135 | 42 | 1 | 221 | 11 | 0 |
| 53 | 5 | 0 | 137 | 38 | 0 | 223 | 56 | 1 |
| 55 | 22 | 1 | 139 | 53 | 1 | 225 | 8 | 0 |
| 57 | 58 | 0 | 141 | 15 | 0 | 227 | 59 | 1 |
| 59 | 17 | 1 | 143 | 4 | 1 | 229 | 41 | 0 |
| 61 | 19 | 0 | 145 | 60 | 0 | 231 | 2 | 1 |
| 63 | 16 | 1 | 147 | 55 | 1 | 233 | 14 | 0 |
| 65 | 48 | 0 | 149 | 13 | 0 | 235 | 45 | 1 |
| 67 | 51 | 1 | 151 | 46 | 1 | 237 | 23 | 0 |
| 69 | 49 | 0 | 153 | 34 | 0 | 239 | 28 | 1 |
| 71 | 26 | 1 | 155 | 9 | 1 | 241 | 36 | 0 |
| 73 | 54 | 0 | 157 | 27 | 0 | 243 | 47 | 1 |
| 75 | 37 | 1 | 159 | 40 | 1 | 245 | 21 | 0 |
| 77 | 31 | 0 | 161 | 24 | 0 | 247 | 6 | 1 |
| 79 | 52 | 1 | 163 | 43 | 1 | 249 | 10 | 0 |
| 81 | 12 | 0 | 165 | 57 | 0 | 251 | 1 | 1 |
| 83 | 39 | 1 | 167 | 50 | 1 | 253 | 35 | 0 |
| | | | 169 | 30 | 0 | 255 | 64 | 1 |

TABLE 4

| Exponent 1 | Exponent 2 | Residue | Exponent 1 | Exponent 2 | Residue | Exponent 1 | Exponent 2 | Residue |
|---|---|---|---|---|---|---|---|---|
| 1 | 0 | 5 | 22 | 0 | 201 | 43 | 0 | 93 |
|   | 1 | 251 |   | 1 | 55 |   | 1 | 163 |
| 2 | 0 | 25 | 23 | 0 | 237 | 44 | 0 | 209 |
|   | 1 | 231 |   | 1 | 19 |   | 1 | 47 |
| 3 | 0 | 125 | 24 | 0 | 161 | 45 | 0 | 21 |
|   | 1 | 131 |   | 1 | 95 |   | 1 | 235 |
| 4 | 0 | 113 | 25 | 0 | 37 | 46 | 0 | 105 |
|   | 1 | 143 |   | 1 | 219 |   | 1 | 151 |
| 5 | 0 | 53 | 26 | 0 | 185 | 47 | 0 | 13 |
|   | 1 | 203 |   | 1 | 71 |   | 1 | 243 |
| 6 | 0 | 9 | 27 | 0 | 157 | 48 | 0 | 65 |
|   | 1 | 247 |   | 1 | 99 |   | 1 | 191 |
| 7 | 0 | 45 | 28 | 0 | 17 | 49 | 0 | 67 |
|   | 1 | 211 |   | 1 | 239 |   | 1 | 187 |
| 8 | 0 | 225 | 29 | 0 | 85 | 50 | 0 | 89 |
|   | 1 | 31 |   | 1 | 171 |   | 1 | 167 |
| 9 | 0 | 101 | 30 | 0 | 169 | 51 | 0 | 189 |
|   | 1 | 155 |   | 1 | 87 |   | 1 | 67 |
| 10 | 0 | 249 | 31 | 0 | 77 | 52 | 0 | 177 |
|   | 1 | 7 |   | 1 | 179 |   | 1 | 79 |
| 11 | 0 | 221 | 32 | 0 | 129 | 53 | 0 | 117 |
|   | 1 | 35 |   | 1 | 127 |   | 1 | 139 |
| 12 | 0 | 81 | 33 | 0 | 133 | 54 | 0 | 73 |
|   | 1 | 175 |   | 1 | 123 |   | 1 | 183 |
| 13 | 0 | 149 | 34 | 0 | 153 | 55 | 0 | 109 |
|   | 1 | 107 |   | 1 | 103 |   | 1 | 147 |
| 14 | 0 | 233 | 35 | 0 | 253 | 56 | 0 | 33 |
|   | 1 | 23 |   | 1 | 3 |   | 1 | 223 |
| 15 | 0 | 141 | 36 | 0 | 241 | 57 | 0 | 165 |
|   | 1 | 115 |   | 1 | 15 |   | 1 | 91 |
| 16 | 0 | 193 | 37 | 0 | 181 | 58 | 0 | 57 |
|   | 1 | 63 |   | 1 | 75 |   | 1 | 199 |
| 17 | 0 | 197 | 38 | 0 | 137 | 59 | 0 | 29 |
|   | 1 | 59 |   | 1 | 119 |   | 1 | 227 |
| 18 | 0 | 217 | 39 | 0 | 173 | 60 | 0 | 145 |
|   | 1 | 39 |   | 1 | 83 |   | 1 | 111 |
| 19 | 0 | 61 | 40 | 0 | 97 | 61 | 0 | 213 |
|   | 1 | 195 |   | 1 | 159 |   | 1 | 43 |
| 20 | 0 | 49 | 41 | 0 | 229 | 62 | 0 | 41 |
|   | 1 | 207 |   | 1 | 27 |   | 1 | 215 |
| 21 | 0 | 245 | 42 | 0 | 121 | 63 | 0 | 205 |
|   | 1 | 11 |   | 1 | 135 |   | 1 | 51 |
|   |   |   |   |   |   | 64 | 0 | 1 |
|   |   |   |   |   |   |   | 1 | 255 |

Those who are skilled in the art will readily perceive how to modify the system. Therefore, the appended claims are to be construed to cover all equivalent structures which fall within the true scope and spirit of the invention.

What is claimed is:

1. A multiplication system for calculating a product of two integers by a use of a prime number m modulus and a predetermined natural number raised to the power of consecutive whole numbers which are congruent with residues modulo of said prime number m, said predetermined natural number being a primitive root inherent in said prime number m, and when arranged in an ascending order, said residues form a set of consecutive integers, whereby a one-to-one correspondence is established between said whole numbers and said consecutive integers, said two integers being given as a first and a second of said consecutive integers, said multiplication system comprising:

first transforming means for transforming said first and said second integers into a first and a second index, respectively, with said first and said second indices being given by those two of said whole numbers which are in a one-to-one correspondence with said first and said second integers, respectively;

summing means for deriving a modulus sum responsive to said first and said second indices, said modulus sum being a sum of said first and said second indices which is congruent with said modulus sum modulo of said prime number m less one; and second transforming means for transforming said modulus sum to said product with said product given by that one of said consecutive integers which is in a one-to-one correspondence with one of said whole numbers, said one whole number being given by said modulus sum.

2. A multiplication system as claimed in claim 1, wherein said first transforming means comprises:

first partial transforming means for transforming said first integer into said first index with said first index being given by a first of said whole numbers which is in a one-to-one correspondence to said first integer; and second partial transforming means for transforming said second integer into said second index with said second index being given by a second of said whole numbers which is in a one-to-one correspondence with said second integer.

3. A multiplication system as claimed in claims 1 or 2, wherein a Fermat number is used as said prime number m.

4. A multiplication system as claimed in claim 3, wherein said first and said second integers are given as a p-digit and a q-digit binary number, where p plus q is not greater than h, where h is equal to a pertinent one of two to the power an integer which is not less than zero to represent that exponent of the number "2" which gives the Fermat number used as said prime number m by $(2^6+1)$.

5. A multiplication system for calculating a product of two odd integers by a use of a first and a second modulus equal to a prime number m which is given by a Fermat number which is not less than five and equal to said prime number m less one, respectively, and by a use of a first and a second congruence relationship, said first congruence relationship being such that a first predetermined natural number raised to the power of consecutive whole numbers of a first group, $(m-1)/2$ in number, are congruent with those residues modulo of said prime number m which form a set of consecutive odd integers, when said residues are arranged in the ascending order, said first predetermined natural number being a primitive root inherent to said prime number m, said second congruence relationship being such that a negative unity raised to the powers 0 and 1 multiplied by a second predetermined natural number raised to the powers of consecutive whole numbers of a second group, $(m-1)/4$ in number, are congruent with those residues of said second modulus which form said set of consecutive odd integers when said second modulus is arranged in the ascending order, said second predetermined natural number being a quasi-primitive root inherent to said second modulus, whereby a one-to-one correspondence is established between said first-group of whole numbers and said consecutive odd integers according to said first congruence relationship and is established between combinations of 0 and 1 with said second group of whole numbers and said consecutive odd integers according to said second congruence relationship, said two odd integers being given as a first and a second of said consecutive odd integers, said second odd integer being enabled to be identical with said first odd integer, said multiplication system comprising:

first transforming means for transforming said first and said second odd integers into a first and a second index of a first group, respectively, with said first and said second first-group indices being given by those two of said first group of whole numbers which are in a one-to-one correspondence with said first and said second odd integers, respectively, according to said first congruence relationship;

first summing means responsive to said first and said second first-group indices for deriving a modulus sum of a first kind with which a sum of said first and said second first-group indices is congruent with respect to said second modulus;

second transforming means for transforming said first kind of modulus sum into a first residue with said first residue being given by that one of said consecutive odd integers which is in a one-to-one correspondence with one of said first group of whole numbers according to said first congruence relationship, said one first group of whole numbers being given by said first kind of modulus sum;

third transforming means for transforming said first odd integer into a first index of a first set and a first index of a second set, both of said sets being in a second group of indices, said third transforming means transforming said second odd integer into a second index of said first set and a second index of said second set, a first combination of said first first-set and said first second-set indices and a second combination of said second first-set and said second second-set indices being given by those two of said combinations of 0 and 1 with said second group of whole numbers which are in one-to-one correspondence with said first and said second odd integers, respectively, according to said second congruence relationship;

second summing means responsive to said first and said second first-set indices for deriving a first modulus sum of a second kind with which a sum of said first and said second first-set indices is a congruent modulo two and responsive to said first and said second second-set indices for deriving a second modulus sum of said second kind with which a sum of said first and said second second-set indices is a congruent modulo $(m-1)/4$;

fourth transforming means for transforming a combination of said first and said second second-kind of modulus sums into a second residue with said second residue being given by that one of said consecutive odd integers which is in a one-to-one correspondence with one of said combinations of 0 and 1 with said second group of whole numbers, said one combination being given by said combination of first and second second-kind modulus sums; and combining means for combining said first and said second residues into said product.

6. A multiplication system as claimed in claim 5, wherein:

said first transforming means comprises:

first partial transforming means for transforming said first odd integer into said first first-group index with said first first-group index being given by a first of said first group of whole numbers that is in a one-to-one correspondence with said first odd integer according to said first congruence relationship;

second partial transforming means for transforming said second odd integer into said second first-group index with said second first-group index being given by a second of said first group of whole numbers that is in a one-to-one correspondence with said second odd integer according to said first congruence relationship;

said third transforming means comprising:

third partial transforming means for transforming said first odd integer into said first first-set and said first second-set indices with said first combination being given by a first of said combinations of 0 and 1 with said second-group whole numbers that is in a one-to-one correspondence with said first combination according to said second congruence relationship; and fourth partial transforming means for transforming said second odd integer into said second first-set and said second second-set indices with said second combination being given by a second of said combinations of 0 and 1 with said second-group whole numbers that is in a one-to-one correspondence with said second combination according to said second congruence relationship.

7. A multiplication system as claimed in claim 6, wherein said combining means comprises:

subtracting means responsive to said first and said second residues for deriving a modulus difference which is congruent with said second residue minus said first residue with respect to said second modulus;

means for calculating said product by summing said modulus difference, said first residue, and said modulus difference multiplied by said second modulus;

said first and said second odd integers being given by a first and a second h-bit binary signal, where h represents a pertinent one of two of the powers of an integer which is not less than zero to represent that exponent of "2" which given said Fermat number by $(2^h+1)$;

said system further comprising means responsive to said first and said second h-bit binary signals for producing a first and a second (h−1)-bit binary signal with the least significant bit removed from each of said first and said second h-bit binary signals, wherein:

said first partial transforming means comprises means responsive to said first (h−1)-bit binary signal for producing a first index signal of a first group, said first first-group index signal being of binary h bits and being representative of said first first-group index;

said third partial transforming means comprising:

means responsive to said first (h−1)-bit binary signal for separating a first single-bit binary signal which is representative of the least significant bit of said first (h−1)-bit binary signal from said first (h−1)-bit binary signal;

means responsive to said first single-bit binary signal for producing a first index signal of a first set in a second group of index signals, said first first-set index signal being a single binary bit and being representative of said first first-set index; and means responsive to said first (h−1)-bit binary signal for producing a first index signal of a second set in said second group, said first second-set index signal being of (h−2) binary bits and being representative of said first second-set index;

said first summing means comprising means responsive to said first and said second first group of index signals for producing a modulus sum signal of a first kind, said first kind of modulus sum signal being of h binary bits and being representative of said first-kind modulus sum;

said second transforming means comprising means responsive to said first kind of modulus sum signal for producing a first residue signal of h binary bits and being representative of said first residue;

said second summing means comprising:

means responsive to said first and second first-set index signals for producing a first modulus sum signal of a second kind, said first second kind of modulus sum signal being a single binary bit and being representative of said first second-kind modulus sum; and means responsive to said first and said second second-set index signals for producing a second modulus sum signal of said second kind, said second second-kind of modulus sum signal being of (h−2) binary bits and being representative of said second second-kind modulus sum;

said fourth transforming means comprising means responsive to said first and said second second-kind of modulus sum signals for producing a second residue signal of binary h bits and being representative of said second residue;

said combining means comprising means operating responsive to said first and said second residue signals for producing a product signal of binary 2h bits and being representative of said product.

8. A multiplication system as claimed in claim 7, wherein said means comprised by said combining means includes:

means responsive to said first and said second residue signals for producing a modulus difference signal of binary h bits and being representative of said modulus difference;

means responsive to said difference signal and to said first residue signal for producing a lower-bit sum signal including a carry bit and a lower-bit signal of h binary bits, said lower-bit sum signal being representative of a binary sum of said difference and of said first residue, said carry bit representating a carry of a binary "0" and "1" when said binary sum exceeds h binary bits and does not exceed said lower-bit signal representing said binary sum and the lower h bits thereof when said binary sum does not and does exceed h binary bits, respectively;

means responsive to said difference signal and said carry bit for producing a higher-bit sum signal of h binary bits and being representative of a binary sum of said difference and said carry bit; and means for arranging said higher-bit sum signal and said lower-bit signal as higher h binary bits and lower h binary bits of said product signal, respectively.

9. A multiplication system as claimed in claims 5 or 6, wherein said combining means comprises:

subtracting means responsive to said first and said second residues for deriving a modulus difference which is congruent with said second residue minus said first residue with respect to said second modulus; and means for calculating said product by summing said modulus difference, said first residue, and said modulus difference multiplied by said second modulus.

10. A multiplication system as claimed in claim 7, wherein said first and said second odd integers are given by a first and a second h-bit binary signal, where h represents a pertinent one of two of the powers of an integer which is not less than zero to represent the exponent of "2" which gives said Fermat number by $(2^h+1)$.

11. A multiplication system as claimed in claim 10 said system comprising means responsive to said first and said second h-bit binary signals for producing a first and a second (h−1)-bit binary signal with the least significant bit being removed from each of said first and said second h-bit binary signals, wherein:

said first partial transforming means comprises means responsive to said first (h−1)-bit binary signal for producing a first index signal of a first group, said first first-group index signal being of binary h bits and being representative of said first first-group index;

said second partial transforming means comprising means responsive to said second (h−1)-bit binary signal for producing a second index signal of said first group, said second first-group index signal being of h binary bits and being representative of said second first-group index;

said third partial transforming means comprising:

means responsive to said first (h−1)-bit binary signal for producing a first single binary bit signal which is representative of the least significant bit of said first (h−1)-bit binary signal and a first (h−2)-bit binary signal representative of said first (h−1)-bit binary signal signal except for said first single-bit binary signal;

means responsive to said first single-bit binary signal for producing a first index signal of a first set in a second group of index signals, said first first-set index signal being a single binary bit signal and being representative of said first first-set index;

means responsive to said first single binary bit signal and said first (h−2)-bit binary signal for producing a third (h−2)-bit binary signal having the same bit pattern as said first (h−2)-bit binary signal and having an inverted bit pattern as compared with said first (h−2)-bit binary signal when said first single binary bit signal represents binary 0 and 1, respectively; and means responsive to said third (h−2)-bit binary signal for producing a first index signal of a second set in said second group, said first second-set index signal being of binary (h−2)-bits and being representative of said first second-set index;

said fourth partial transforming means comprising:

means responsive to said second (h−1)-bit binary signal for producing a second single binary bit signal which is representative of the least significant bit of said second (h−1)-bit binary signal and a second (h−2)-bit binary signal except for said second single binary bit signal;

means responsive to said second single binary bit signal for producing a second index signal of said first set, said second first-set index signal being of a single binary bit and being representative of said second first-set index;

means responsive to said second single binary bit signal and said second (h−2)-bit binary signal for producing a fourth (h−2)-bit binary signal having the same bit pattern as said second (h−2)-bit binary signal and having an inverted bit pattern as compared with said second (h−2)-bit binary signal when said second single-bit binary signal represents binary 0 and 1, respectively; and means responsive to said fourth (h−2)-bit binary signal for producing a second index signal of said second set, said second second-set index signal being of (h−2) binary bits and being representative of said second second-set index;

said first summing means comprising means responsive to said first and said second first-group index signals for producing a modulus sum signal of a first kind, said first kind of modulus sum signal being of h binary bits and being representative of said first modulus sum;

said second transforming means comprising means responsive to said first kind of modulus sum signal for producing a first residue signal of binary h bits and being representative of said first residue;

said second summing means comprising:

means responsive to said first and said second first-set of index signals for producing a first modulus sum signal of a second kind, said first second kind of modulus sum signal being a single binary bit and being representative of said first second kind of modulus sum; and means responsive to said first and said second-set index signals for producing a second modulus sum signal of said second kind, said second second-kind of modulus sum signal being of (h−2) binary bits and being representative of said second second-kind of modulus sum;

said fourth transforming means being responsive to said first and said second second kind of modulus sum signals for producing a second residue signal of h binary bits and being representative of said second residue and comprising:

means responsive to said second second-kind of modulus sum signal for producing a bit pattern signal of (h−2) binary bits and of a bit pattern which is dependent on said second residue signal;

means responsive to said bit pattern signal and to said first second-kind of modulus sum signal for producing a partial residue signal of (h−2) binary bits and being representative of (h−2) higher bits of said second residue signal; and means responsive to said partial residue signal and to said first second kind of modulus sum signal for producing said second residue signal with the higher (h−2) binary bits, the least significant bit except one, and the least significant bit given by said partial residue signal, said first second-kind of modulus sum signal, and a binary "1", respectively.

12. A multiplication system as claimed in claim 10, wherein said means comprised by said combining means includes:

means responsive to said first and said second residue signals for producing a modulus difference signal of binary h bits and being representative of said modulus difference;

means responsive to said difference signal and to said first residue signal for producing a lower-bit sum signal including a carry bit and a lower-bit signal of h binary bits, said lower-bit sum signal being representative of a binary sum of said difference and of said first residue, said carry bit representing a carry of a binary "0" and "1" when said binary sum exceeds h binary bits and does not exceed said lower-bit signal representing said binary sum and the lower h bits thereof when said binary sum does not and does exceed h binary bits, respectively;

means responsive to said difference signal and said carry bit for producing a higher-bit sum signal of h binary bits and being representative of a binary sum of said difference and said carry bit; and means for arranging said higher-bit sum signal and said lower-bit signal as higher h binary bits and lower h binary bits of said product signal, respectively.

13. A multiplication system for calculating a product of two integers by a use of a first and a second modulus which is equal to a prime number m given by a Fermat number which is not less than five and is equal to said prime number m less one, respectively, and by a use of first and second congruence relationships, said first congruence relationship being such that a first predetermined natural number raised to the power of those consecutive whole numbers (which are (m−1)/2 in number) of a first group which are congruent with those residues modulo of said prime number m which form a set of consecutive odd integers, when the residues are arranged in the ascending order, said set of odd integers also being (m−1)/2 in number and being arranged in the ascending order, said first predetermined natural number being a primitive root which is inherent to said prime number m, said second congruence relationship being such that minus unity raised to the power of 0 and 1 multiplied by a second predetermined natural number raised to the power of (m−1)/4 consecutive whole numbers of a second group, are congruent with those residues with respect to said second modulus which, when arranged in the ascending order, form said set of consecutive odd integers, said second predetermined natural number being a quasi-primitive root inherent to said second modulus, whereby a one-to-one correspondence is established between said first-group of whole numbers and said consecutive odd integers according to said first congruence relationship and between combinations of 0 and 1 with said second group of whole numbers and said consecutive odd integers according to said second congruence relationship, said two integers being given by a first and a second h-bit binary signal where h represents that exponent of the number "2" which represents said Fermat number as $(2^h+1)$, said multiplication system comprising:

means responsive to said first and said second h-bit binary signals for producing a first and a second (h−1)-bit binary signal with the least significant bit being removed from each of said first and said second h-bit binary signals, said first and said second (h−1)-bit binary signals representing first and second odd integers when a binary "1" bit is added as a new least significant bit;

first transforming means for transforming said first and said second (h−1)-bit binary signals into a first and a second index signal of a first group, respectively, each of said first and said second first-group index signals being of h binary bits, said first and said second first-group index signals being representative of a first and a second index of a first group, respectively, said first and said second first-group indices being those two of said first-group of whole numbers which are in a one-to-one correspondence with said first and said second odd integers, respectively, according to said first congruence relationship;

first summing means responsive to said first and said second first-group of index signal for producing a modulus sum signal of a first kind of h binary bits, said first-kind of modulus sum signals being representative of a modulus sum of a first kind with which a sum of said first and said second first-group indices is congruent with respect to said second modulus;

second transforming means for transforming said first kind of modulus sum signal into a first residue signal of h binary bits, said first residue signal being representative of a first residue given by that one of said consecutive odd integers which is in a one-to-one correspondence with one of said first group of whole numbers according to said first congruence relationship, said one first group of whole number being given by said first kind of modulus sum;

third transforming means for transforming said first (h−1)-bit binary signal into a first combination of a first index signal of a first set and a first index signal of a second set, both sets being in a second group of index signals, and for transforming said second (h−1)-bit binary signal into a second combination of a second index signal of said first set and a second index signal of said second set, each of said first set of index signals being of single binary bits, each of said second-set index signals being of (h−2) binary bits, said first and said second first-set index signals being representative of a first and a second index of a first set, respectively, said first and said second second-set index signals being representative of a first and a second index of a second set, both sets of indices being in a second group of indices, said first combination of a first first-set and a first second-set indices and said second combination of a second first-set and a second second-set indices being given by those two of said combinations of 0 and 1 with said second group of whole numbers being in a one-to-one correspondence with said first and said second odd integers, respectively, according to said second congruence relationship;

second summing means responsive to said first and said second first-set index signals for producing a first modulus sum signal of a second kind and responsive to said first and said second second-set index signals for producing a second modulus sum signal of said second kind, said first second-kind of modulus sum signal being a single binary bit and being representative of a first modulus sum of a second kind with which a sum of said first and said second first-set indices is a congruent modulo "2", said second second-kind of modulus sum signal being (h−2) binary bits and being representative of a second modulus sum of said second kind with which a sum of said first and said second second-set indices is congruent modulo (m−1)/4;

fourth transforming means for transforming a combination of said first and said second second-kind of modulus sum signals to a second residue signal of h binary bits, said second residue signal being representative of a second residue given by that one of said consecutive odd integers which is in a one-to-one correspondence with one of said combination of 0 and 1 with said second group of whole numbers, said one combination being given by said combination of first and second second-kind of modulus sum;

combining means for combining said first and said second residue signals into a resulting signal of 2h binary bits and being representative of a result of a multiplication of said first and said second odd integers;

correction signal-producing means responsive to said first and said second h-bit binary signal for producing a correction signal representative of a correction integer which is equal to zero when each of two integers is odd, equal to the integer represented by said second h-bit binary signal when the integer represented by said first h-bit binary signal is even, equal to, the integer represented by said first h-bit binary when the integer represented by said second h-bit binary signal is even, and equal to a sum of said two integers, and unity, when the integer represented by said second h-bit binary signal is even, and each of said two integers is even; and adjusting means responsive to said resulting signal and said correction signal for producing a product signal of 2h binary bits and which is representative of said product with said product being given by subtracting said correction integer from said results of said multiplication.

14. A multiplication system as claimed in claim 13, wherein said combining means comprises:

means responsive to said first and said second residue signals for producing a difference signal of h binary bits and being representative of a difference congruent with said second residue minus said first residue with respect to said second modulus;

means responsive to said difference signal and said first residue signal for producing a lower-bit sum signal consisting of a carry bit and of lower h bits of said result signal, said lower-bit sum signal being representative of a binary sum of said difference and said first residue, said carry bit representing a carry of a binary "1" and "0" when said binary sum does and does not exceed h binary bits, said lower h bits of said result signal being said binary sum and lower h bits thereof when said binary sum and does not and does exceed binary h bits, respectively; and means responsive to said difference signal and said carry bit for producing higher h bits of said result signal representative of a binary sum of said difference and of said carry.

15. A multiplication system as claimed in claims 13 or 14, wherein said correction signal-producing means comprises:

first selecting means responsive to the least significant bit of said first h-bit binary signal for producing a first selected signal of h binary bits by selecting h-bit binary zeros and said first h-bit binary signal when the least significant bit of said first h-bit binary signal is binary "1" or "0", respectively;

second selecting means responsive to the least significant bit of said second h-bit binary signal for producing a second selected signal of h binary bits by selecting h-bit binary zeros and said second h-bit binary signal when the least significant bit of said second h-bit binary signal is a binary "1" and "0," respectively;

means including a gate responsive to the least significant bits of said first and said second h-bit binary signals for producing a gate output;

h-bit adder means responsive to said gate output as a carry-in signal for producing an h-bit sum signal and a carry-out signal, said carry-out signal becoming a binary "1" or "0" when a sum of said first and said second selected signals does and does not exceed h binary bits, respectively, said h-bit sum signal being the lower h bits of the sum of said first and said second selected signals;

first complementor means responsive to said h-bit sum signal for producing the lower h bits of said correction signal which are representative of two's complement of said h-bit sum signal; and second complementor means responsive to said carry-out signal for producing a most significant bit of said correction signal representative of a "2's" complement of said carry-out signal.

16. A multiplication system as claimed in claim 14 wherein said adjusting means comprises a 2h-bit adder means having lower h-bit input terminals for the lower h bits of said result signal and the lower h bits of said correction signal and higher h-bit input terminals for the higher h bits of said resulting signal and an h-bit input signal, the least significant bit of said h-bit input signal being given by the most significant bit of said correction signal, the remaining higher (h−1) bits of said h-bit input signal being given by (h−1)-bit binary ones.

17. An asynchronous binary multiplication system driven by input signals identifying first and second numbers which are a multiplicand and a multiplier, said system comprising first and second read-only memory means, each of said memory means storing a table of data for transforming individually associated input signals into non-logarithmic exponent signals corresponding to said input signals, modulus adding means for adding said exponent signals, and inverse transform means responsive to said adding means for transforming said added exponent signals into a signal indicating the product of said first number multiplied by said second number, said product being free of rounding errors, said inverse transform means comprising a read-only memory storing a table of data for converting said adding exponent signals into said product.

18. An asynchronous binary multiplication system comprising a pair of read-only memory means, a pair of demultiplexing means for applying multiplicand and multiplier signals with a predetermined bit pattern to individually associated ones of said read-only memory means, said read-only memory means containing stored tables of data for transforming the output of the associated demultiplexing means into corresponding non-logarithmic exponent signals, means for adding the transformed output of said memory means, means responsive to said adding means for transforming the added outputs of said memory means into signals representing a product of said multiplication, said product being free of rounding errors, demultiplexing means for converting said product signals into predetermined bit patterns, and control means on each of said demultiplexing means for selecting said bit pattern responsive to at least one signal in said multiplicand and multiplier signals.

19. A method of asynchronously multiplying two of a set of binary numbers representing a multiplicand and a multiplier, said method comprising the steps of:
 a. separately transforming each of the two numbers into non-logarithmic exponents which individually correspond to said two numbers, said transforms being accomplished by selectively addressing read-only memories storing tables of data representing sets of numbers including at least said two numbers;
 b. adding the non-logarithmic transform exponents; and
 c. transforming the sum of the added exponents back into said set of numbers by addressing another read-only memory containing tables of data representing a product of the multiplication in terms of said added exponents, said product being free of rounding errors.

20. The method of claim 19 wherein step a. includes the added steps of dividing each of said two members into separate parts and transforming said separate parts into individual exponents representing the divided parts and recombining the parts transformed in step c. to produce a product of said two numbers.

* * * * *

UNITED STATES PATENT AND TRADEMARK OFFICE
CERTIFICATE OF CORRECTION

PATENT NO. : 4,366,549
DATED : December 28, 1982
INVENTOR(S) : AISUKE KATAYAMA

It is certified that error appears in the above—identified patent and that said Letters Patent is hereby corrected as shown below:

Col. 12, Line 59, "h = 2" should be --h - 2--;

Col. 13, Line 64, "B$_2$ = 14" should be --a$_2$ = 14--;

Col. 15, Line 7, "mode" should be -- mod --.

Col. 18, Lines 28 and 29, "+O(X-+Y+1) should be

-- +O(X+Y+1) --.

Col. 14, Line 48, "a" should be --a$_p$--.

Signed and Sealed this

Tenth Day of May 1983

[SEAL]

Attest:

GERALD J. MOSSINGHOFF

Attesting Officer    Commissioner of Patents and Trademarks